United States Patent
Maehira

(10) Patent No.: US 8,294,941 B2
(45) Date of Patent: Oct. 23, 2012

(54) IMAGE FORMING SYSTEM CAPABLE OF QUICKLY DETERMINING WHETHER TO CONVEY SUCCEEDING RECORDING MEDIUM TOWARD RECORDING HEAD

(75) Inventor: Hirotoshi Maehira, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1072 days.

(21) Appl. No.: 11/737,912

(22) Filed: Apr. 20, 2007

(65) Prior Publication Data
US 2007/0247651 A1    Oct. 25, 2007

(30) Foreign Application Priority Data
Apr. 21, 2006    (JP) .................. 2006-117950

(51) Int. Cl.
    *G06K 15/00*    (2006.01)
(52) U.S. Cl. ....... 358/1.17; 358/1.12; 358/412; 347/104
(58) Field of Classification Search ................. 358/1.12, 358/1.17, 412
    See application file for complete search history.

(56) References Cited

U.S. PATENT DOCUMENTS

| | | | | |
|---|---|---|---|---|
| 5,099,291 A * | 3/1992 | Yoshioka et al. | ............... | 399/17 |
| 6,304,335 B1 * | 10/2001 | Furuya et al. | ................ | 358/1.15 |
| 6,587,655 B2 * | 7/2003 | Maekawa | ........................ | 399/82 |
| 6,594,030 B1 * | 7/2003 | Ahlstrom et al. | ............ | 358/1.15 |
| 6,791,725 B1 * | 9/2004 | Ohtani | ........................ | 358/498 |
| 6,977,734 B2 * | 12/2005 | Shima | .......................... | 358/1.12 |
| 7,652,777 B2 * | 1/2010 | Enomoto | ...................... | 358/1.12 |
| 2001/0033050 A1 * | 10/2001 | Kinoshita et al. | ............ | 271/3.17 |
| 2002/0080370 A1 * | 6/2002 | Shishido | .......................... | 358/1.1 |
| 2003/0020967 A1 * | 1/2003 | Okamoto et al. | ............. | 358/498 |
| 2004/0247354 A1 * | 12/2004 | Newell et al. | ................. | 399/388 |
| 2005/0141032 A1 * | 6/2005 | Yamamoto | .................... | 358/1.17 |
| 2005/0157326 A1 * | 7/2005 | Lee | ............... | 358/1.14 |
| 2005/0270552 A1 * | 12/2005 | Sakamoto | .................... | 358/1.13 |
| 2007/0048058 A1 | 3/2007 | Koga et al. | | |
| 2007/0048059 A1 | 3/2007 | Asada et al. | | |
| 2007/0057447 A1 | 3/2007 | Asada et al. | | |
| 2007/0231044 A1 | 10/2007 | Koga et al. | | |

FOREIGN PATENT DOCUMENTS

| | | |
|---|---|---|
| JP | H11-292324 A | 10/1999 |
| JP | 2003-285478 A | 10/2003 |
| JP | 2005-063051 A | 3/2005 |
| JP | 2003036013 A | 2/2007 |
| JP | 2007-090801 A | 4/2007 |
| JP | 2007-091470 A | 4/2007 |

OTHER PUBLICATIONS

Japan Patent Office, Office Action for Japanese Patent Application No. 2006-117950 (counterpart to above-captioned patent application), mailed Dec. 14, 2010.

\* cited by examiner

*Primary Examiner* — Benjamin O Dulaney
(74) *Attorney, Agent, or Firm* — Baker Botts L.L.P.

(57) ABSTRACT

A data processor controls an image-forming device as the control target. The image-forming device is capable of recording images on a recording medium conveyed one sheet at a time from a feeding unit based on image data transmitted from the data processor. The data processor controls the image-forming device to begin conveying an N+1$^{th}$ sheet of the recording medium before the image-forming device finishes recording an image on an N$^{th}$ sheet of recording medium on the condition that the data processor has transmitted indicate data to the image-forming device indicating the existence of an image to be recorded on the N+1$^{th}$ sheet of recording medium.

9 Claims, 20 Drawing Sheets

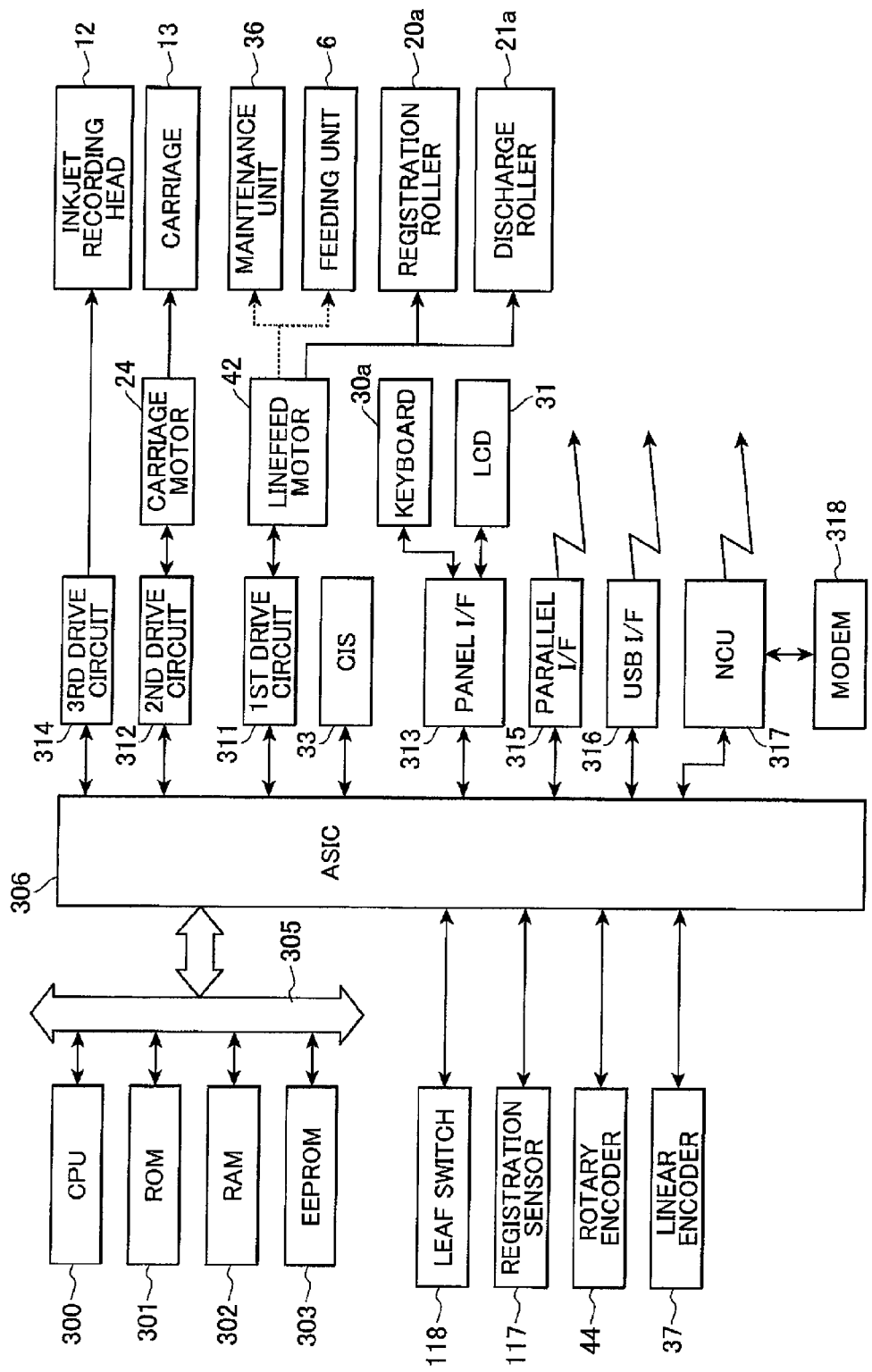

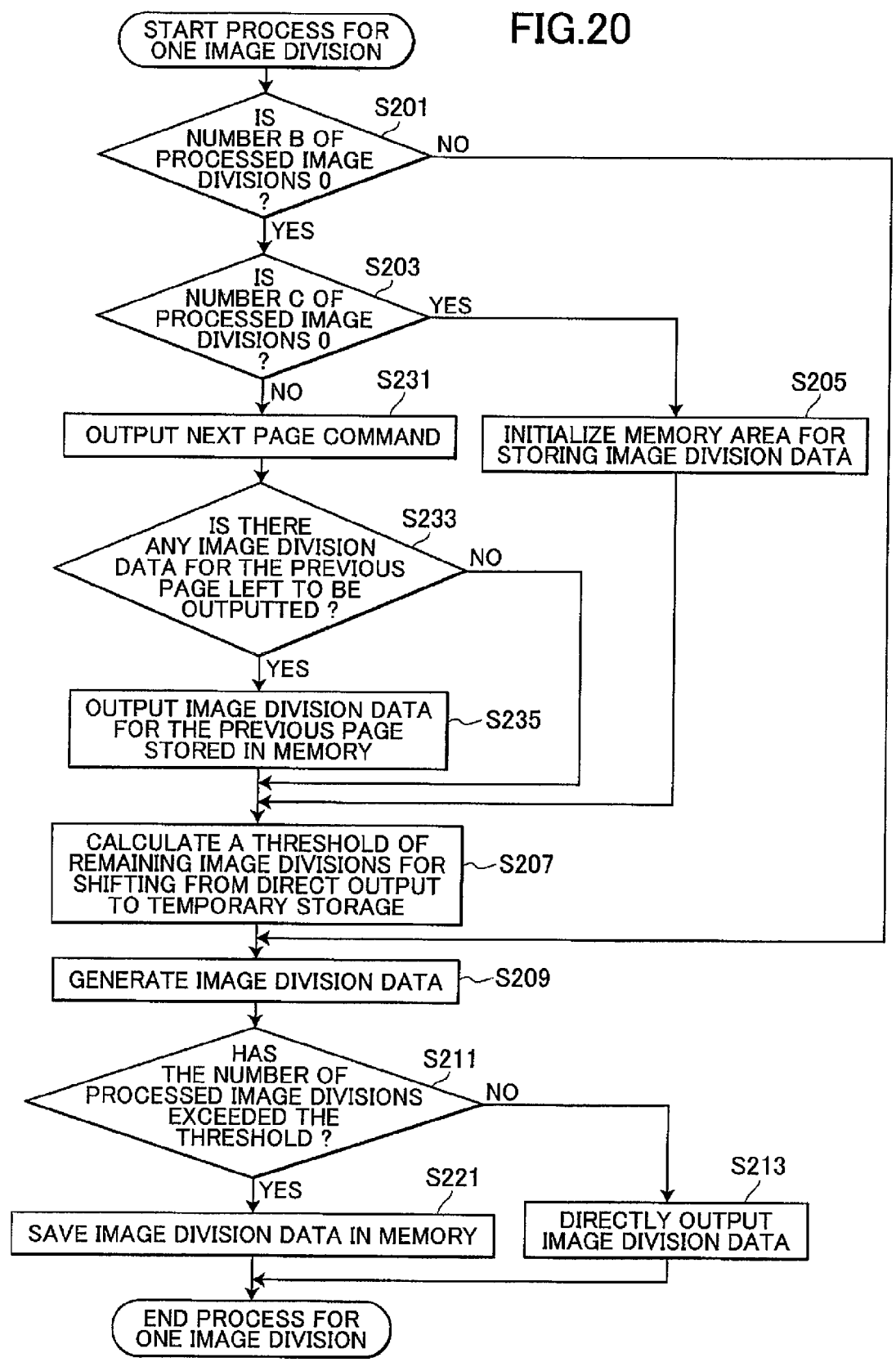

US 8,294,941 B2

IMAGE FORMING SYSTEM CAPABLE OF QUICKLY DETERMINING WHETHER TO CONVEY SUCCEEDING RECORDING MEDIUM TOWARD RECORDING HEAD

CROSS REFERENCE TO RELATED APPLICATIONS

This application claims priority from Japanese Patent Application No. 2006-117950 filed Apr. 21, 2006. The entire content of its priority application is incorporated herein by reference.

BACKGROUND OF THE INVENTION

1. Field of the Invention

The present invention relates to an image forming system configured of a data processor and an image-forming device.

2. Description of the Related Art

There are printers and various devices having printer functions well known in the art. These devices will be referred to collectively hereafter as image-forming devices. Among these image-forming devices, there have been proposed devices configured to continuously feed a succeeding sheet of recording medium before recording is completed on the preceding sheet when it, is determined that image data for an image to be recorded on the succeeding sheet is stored in memory.

If image data for an image to be recorded on a succeeding sheet of recording medium is stored in memory, this type of image-forming device can smoothly continue conveying a succeeding sheet of recording medium after the preceding sheet.

SUMMARY OF THE INVENTION

In view of the foregoing, it is an object of the present invention to provide a data processor capable of controlling an image-forming device to begin conveying a succeeding sheet of recording medium, even when image data for an image to be recorded on the succeeding sheet has not been transferred to the image-forming device.

It is another object of the present invention to provide an image forming system configured of the data processor and the image-forming device in which the data processor controls the image-forming device so as to begin conveying a succeeding sheet of recording medium, even when image data for an image to be recorded on the succeeding sheet has not been transferred to the image-forming device.

Next, the distinctive configuration of the present invention will be described.

A data processor according to one aspect of the present invention controls an image-forming device as the control target. The image-forming device is capable of recording images on a recording medium conveyed one sheet at a time from a feeding unit based on image data transmitted from the data processor. The data processor controls the the recording medium before the image-forming device finishes recording an image on an $N^{th}$ sheet of recording medium on the condition that the data processor has transmitted indicate data to the image-forming device indicating the existence of an image to be recorded on the $N+1^{th}$ sheet of recording medium. A data processor includes a data transmitting unit, a next page determining unit, and an indicate data transmitting unit. The data transmitting unit is configured to transmit to an image-forming device image data to be recorded on a sheet of recording medium. The next page determining unit is configured to determine whether there exists an image to be recorded on an $N+1^{th}$ sheet of recording medium before the data transmitting unit has completed transmitting image data for an image to be recorded on an $N^{th}$ sheet of recording medium. Note that N is an integer greater than or equal to 1. The indicate data transmitting unit is configured to transmit indicate data indicating existence of the image to be recorded on the $N+1^{th}$ sheet of recording medium to the image-forming device before the data transmitting unit has completed transmitting the image data for the image to be recorded on the $N^{th}$ sheet of recording medium when the next page determining unit determines that there exists the image to be recorded on the $N+1^{th}$ sheet, of recording medium. The image-forming device operatively connected to the data processor thus configured operates to convey the $N+1^{th}$ sheet of recording medium for recordation before an entire image has been recorded on the $N^{th}$ sheet of recording medium under a condition that the indicate data indicating existence of the image to be recorded on the $N+1^{th}$ sheet of recording medium is received at the image-forming device. Therefore, the data processor can control the image-forming device to begin conveying the $N+1^{th}$ sheet of recording medium for recordation before an entire image has been recorded on the $N^{th}$ sheet of recording medium under a condition that, the indicate data indicating existence of the image to be recorded on the $N+1^{th}$ sheet of recording medium is received at the image-forming device. In this way, the image-forming device can record images on a plurality of sheets of recording medium more quickly than an image-forming device that begins conveying the $N+1^{th}$ sheet of recording medium after receiving image data for the image to be recorded on the $N+1^{th}$ sheet.

With the data processor having this construction, the data transmitting unit may acquire image data and transmit the image data to the image-forming device when image data supplied from an application or other means upstream in the data transmission path can be transmitted directly to the image-forming device. When the means on the upstream side of the data transmission path provides intermediate data as a base for image data, the data transmitting unit may acquire the image data via a means for generating image data based on the intermediate data and may transmit this image data to the image-forming device. Further, after acquiring the image data, the data transmitting unit transmits the image data directly to the image-forming device in some cases, and temporarily stores the image data in a storing unit or memory in other cases. When the data transmitting unit temporarily stores the image data in the memory, the data transmitting unit may subsequently acquire the image data from the memory and transmit the image data to the image-forming device. Hence, the data transmitting unit may acquire image data as the target of transmission from a variety of sources.

According to another aspect of the invention, there is provided a method of controlling an image-forming device, the method including: transmitting image data for an image to be recorded on an $N^{th}$ sheet of recording medium to the image-forming device where N is an integer greater than or equal to 1; determining whether there exists an image to be recorded on an $N+1^{th}$ sheet of recording medium before transmitting the image data for the image to be recorded on the $N^{th}$ sheet of recording medium has been completed; and transmitting indicate data indicating existence of the image to be recorded on the $N+1^{th}$ sheet of recording medium to the image-forming device before transmitting the image data for the image to be recorded on the $N^{th}$ sheet of recording medium has been completed when determination is made so that there exists the image to be recorded on the $N+1^{th}$ sheet of recording medium, whereby the image-forming device begins conveying the $N+1^{th}$ sheet of recording medium for recordation before an entire image has been recorded on the $N^{th}$ sheet of recording medium under a condition that the image-forming device receives the indicate data indicating existence of the image to be recorded on the $N+1^{th}$ sheet of recording medium.

According to still another aspect of the invention, there is provided a computer-readable carrier, which may be a computer-readable medium, that stores a data processing program including: instructions for transmitting image data for an image to be recorded on an $N^{th}$ sheet of recording medium to the image-forming device where N is an integer greater than or equal to 1; instructions for determining whether there exists an image to be recorded on an $N+1^{th}$ sheet of recording medium before transmitting the image data for the image to be recorded on the $N^{th}$ sheet of recording medium has been completed; and instructions for transmitting indicate data indicating existence of the image to be recorded on the $N+1^{th}$ sheet of recording medium to the image-forming device before transmitting the image data for the image to be recorded on the $N^{th}$ sheet of recording medium has been completed when determination is made so that there exists the image to be recorded on the $N+1^{th}$ sheet of recording medium, causing the image-forming device to begin conveying the $N+1^{th}$ sheet of recording medium for recordation before an entire image has been recorded on the $N^{th}$ sheet of recording medium under a condition that the image-forming device receives the indicate data indicating existence of the image to be recorded on the $N+1^{th}$ sheet of recording medium.

BRIEF DESCRIPTION OF THE DRAWINGS

The particular features and advantages of the invention as well as other objects will become apparent from the following description taken in connection with the accompanying drawings, in which:

FIG. 15 is a block diagram showing the functions of a controller used in the image-recording device;

FIG. 20 is a flowchart illustrating steps in a data process for one image division.

DETAILED DESCRIPTION OF THE PREFERRED EMBODIMENTS

Next, a preferred embodiment of the present invention will be described.

First, the overall structure of an image-forming system and the structure of a data processor employed in the image-forming system will be described with reference to FIG. 1.

Figure 1:
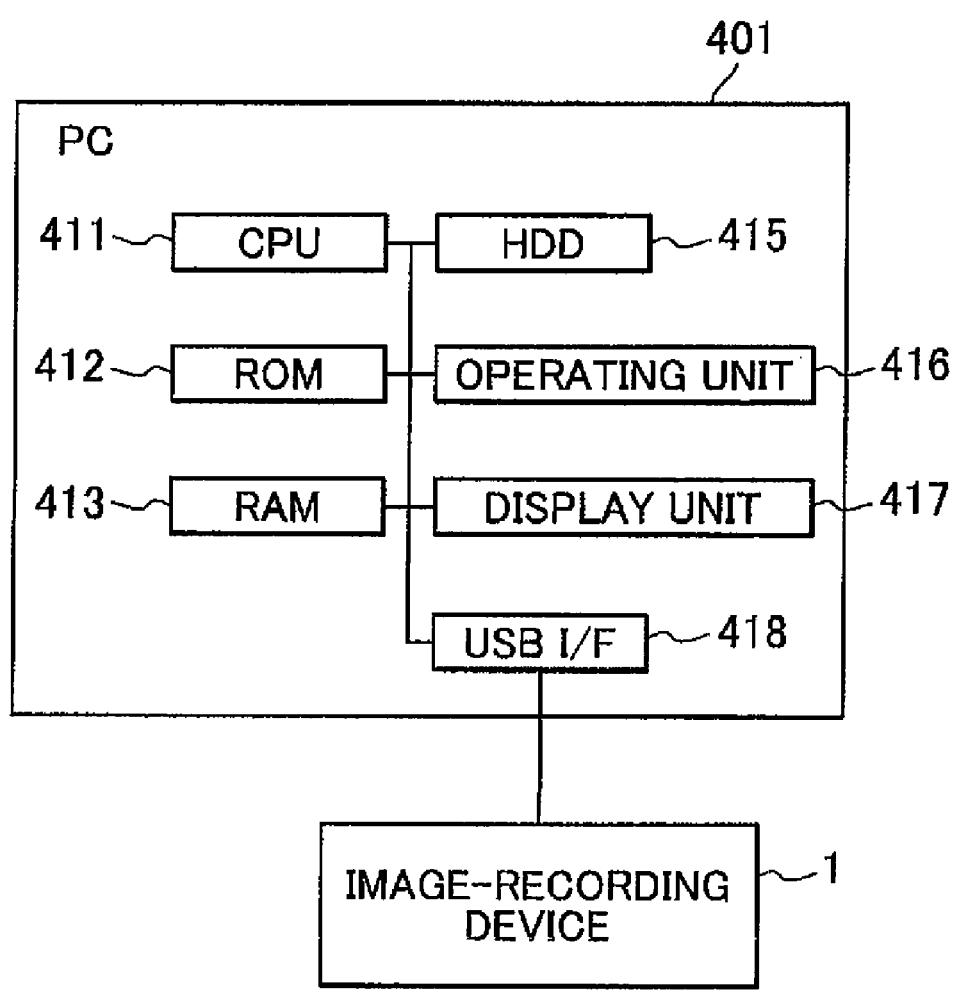
FIG. 1 is a block diagram showing the overall structure of an image-forming system.

FIG. 1 is a block diagram of the image-forming system. The image-forming system includes a personal computer 401 (hereinafter referred to as PC 401) serving as an example of the data processor of the present invention, and an image-recording device 1 serving as an example of an image-forming device of the present invention.

As shown in FIG. 1, the PC 401 includes a CPU 411, a ROM 412, a RAM 413, a hard disk drive 415 (hereinafter referred to as HDD 415), an operating unit 416, a display unit 417, and a USB interface 418.

The CPU 411 controls the components in the PC 401 and executes various computations based on programs stored in the ROM 412 and RAM 413. The CPU 411 executes such processes as the operating system (OS), device drivers, and applications.

The ROM 412 is a storage device capable of preserving the stored content after the power switch on the PC 401 is switched off. The ROM 412 stores a basic input output system (BIOS) and read-only data that is normally not updated, for example.

The RAM 413 is a storage device that serves as a main memory or the like accessed directly by the CPU 411. Various software programs stored on the HDD 415 are loaded into the RAM 413 to be executed. The RAM 413 also stores the results of computations by the CPU 411 and data read from the HDD 415.

The HDD 415 functions to store various programs and data files and stores programs for implementing the functions of the OS, device drivers, and applications.

The operating unit 416 is an input device through which the user can input various commands and is configured of a keyboard, various pointing devices, such as a mouse, and the like. The display unit 417 is an output device for presenting various information to the user and is configured of a liquid crystal display capable of displaying color images, for example.

The USB interface 418 is a serial interface conforming to the USB specification. Although various devices, including a printer, keyboard, mouse, scanner, speaker, and storage device, can be connected to the USB interface 418, in the preferred embodiment the image-recording device 1 is connected to the USB interface 418.

Detailed Description of the Image-Forming Device

Next, the structure of the image-recording device 1 will be described in greater detail.

Figure 2:
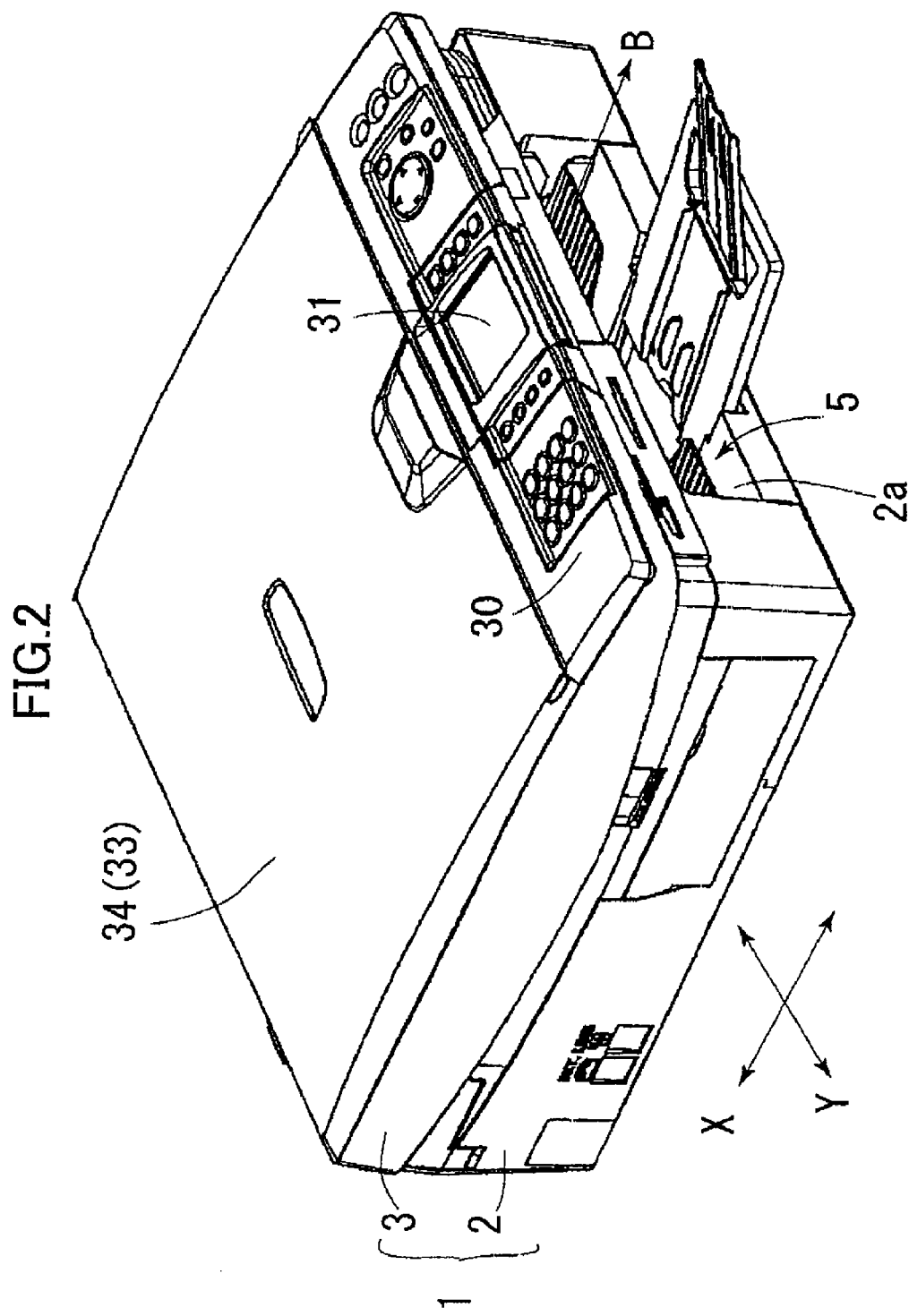
FIG. 2 is a perspective view showing the external appearance of an image-recording device.

An image-recording device according to the preferred embodiment of the invention will be described with reference to the accompanying drawings. FIG. 2 is a perspective view showing a part of the inner structure of the image-recording device according to the embodiment of the invention. The terms "upward", "downward", "upper", "lower", "above", "below", "beneath" and the like will be used throughout the description assuming that the image-recording device is disposed in an orientation in which it is intended to be used. In use, the printer is disposed as shown in FIG. 2.

FIG. 2 is a perspective view showing an image-recording device 1 serving as an embodiment of the printing device according to the present invention, The image-recording device 1 shown in FIG. 2 has a facsimile function, printer function, copier function, scanner function, and the like. The image-recording device 1 is configured of a main casing 2 that is substantially box-shaped and open on the top, and an upper case 3 disposed on top of the main casing 2 and capable of rotating open and closed about the rotational axis of hinges or the like (not shown) provided on one side of the main casing 2. In the following description, the near side of the image-recording device 1 in FIG. 1 will be referred to as the front, while the left-to-right direction (main scanning direction and Y direction), front-to-rear direction (subscanning direction and X direction), and vertical direction will be based on the orientation of the image-recording device 1 shown in FIG. 1. The main casing 2 and upper case 3 are formed of a synthetic resin according to an injection molding process.

A control panel 30 is provided on the top surface of the upper case 3 and the front end thereof. The control panel 30 includes various buttons, including numerical buttons, a start button, and functional buttons. The user manipulates these buttons to perform various operations. The control panel 30 also includes a liquid crystal display (LCD) 31 for displaying the settings and status of the image-recording device 1 and various operational messages as needed.

A scanner 33 is disposed in the upper case 3 to the rear of the control panel 30. The scanner 33 has a flatbed scanning unit with a large glass plate on which an original to be scanned is placed, and a cover 34 capable of rotating over the flatbed scanning unit to cover or expose the top surface thereof. The scanner 33 functions to read images from a facsimile original to be transferred to another facsimile device with the facsimile function or an original to be copied with the copy function.

While not shown in the drawings, a line-type contact image sensor is disposed beneath the glass plate of the flatbed scanning unit. The contact image sensor is one example of a photoelectric conversion device for scanning the image surface of an original placed on the glass plate.

The cover 34 is capable of rotating open and closed about hinges provided on the rear surface side of the image-recording device 1 (far side in FIG. 2).

The structure of a printing device (recording unit) will be described next. A paper cassette 5 is disposed in the left-to-right center region of the main casing 2. A bottom surface of the paper cassette 5 supports a plurality of sheets of paper P in a stacked and substantially horizontal state. The paper cassette 5 can be pulled out from an opening 2a formed in the front surface of the main casing 2.

Figure 3:
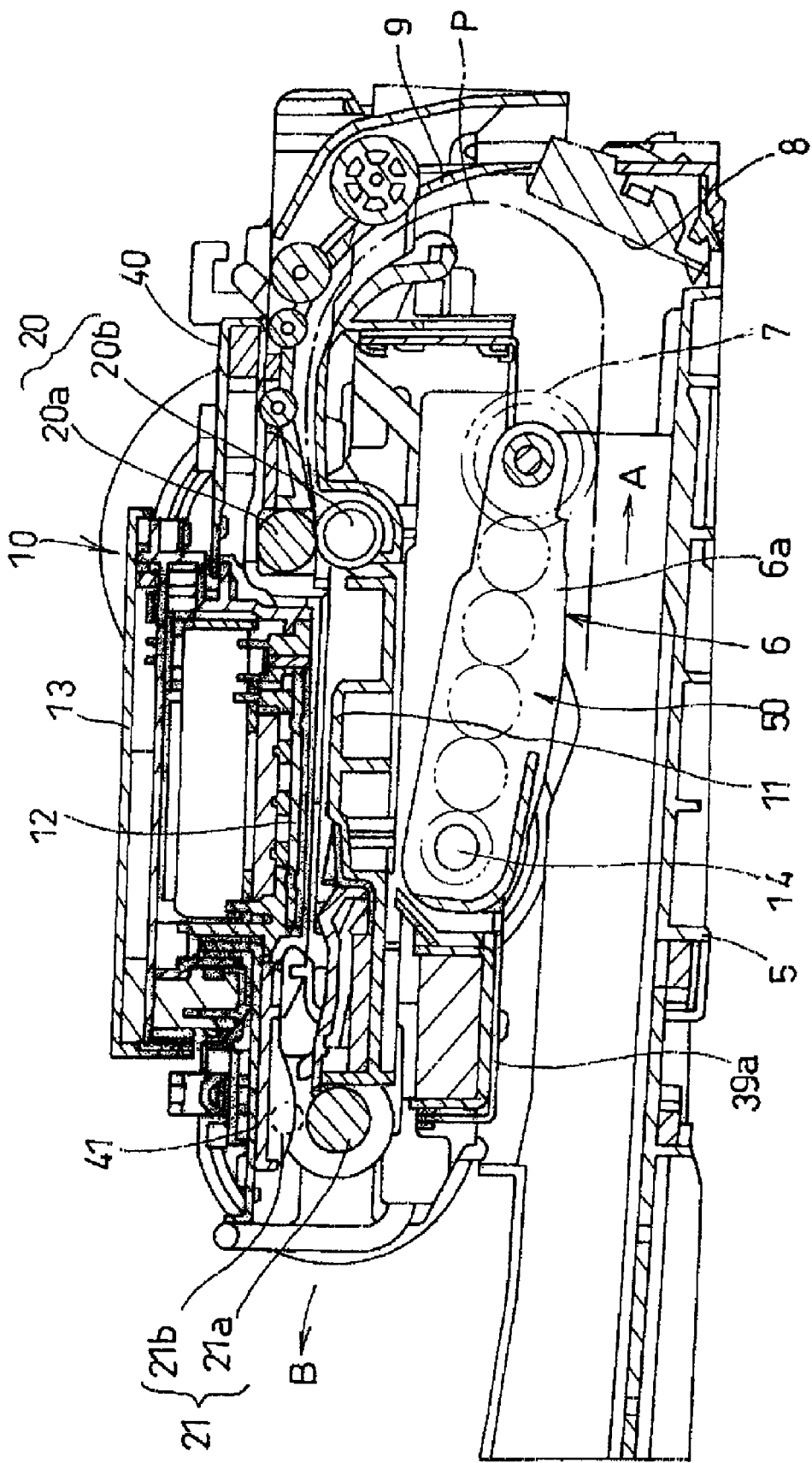
FIG. 3 is a side cross-sectional view of the image-recording device when a paper cassette is mounted in a recording unit.

Next, the internal structure of the main casing 2 will be described with reference to FIGS. 3-5. As shown in FIG. 3, a sloped separation surface 8 is disposed at an end of the paper cassette 5. A separating member (not shown) having a large friction coefficient is provided on the sloped separation surface 8. The main casing 2 also accommodates a feeding unit 6 disposed above the paper cassette 5 and including a feeding roller 7; a conveying path having a U-shaped section 9 in the rear section of the main casing 2, the conveying path guiding the paper P upward through the U-shaped section 9 and back toward the front in a substantially horizontal state; a plate-shaped platen 11 disposed along the conveying path as a paper-supporting part; and a recording unit 10 disposed above the platen 11 and having an inkjet recording head 12 for recording images on the paper P by ejecting ink onto the surface of the paper P supported on the platen 11.

More specifically, the recording unit 10 is configured primarily of a carriage 13 supporting the inkjet recording head 12, the platen 11 formed of a synthetic resin; a carriage motor 24 for reciprocating the carriage 13 with forward and backward movements; a timing belt 25 connected to the carriage motor 24; and an engine frame 39 formed of metal plates for supporting these components.

The engine frame 39 is disposed above the paper cassette 5 in the rear side of the main casing 2 and functions as a support frame. The engine frame 39 is formed of metal and includes a box-like main body 39a. A pair of guide plates 40 and 41 (see FIG. 4) is mounted on top of the main body 39a and extends in the left-to-right direction (main scanning direction; Y direction) of the main casing 2 for slidably supporting the carriage 13.

Figure 4:
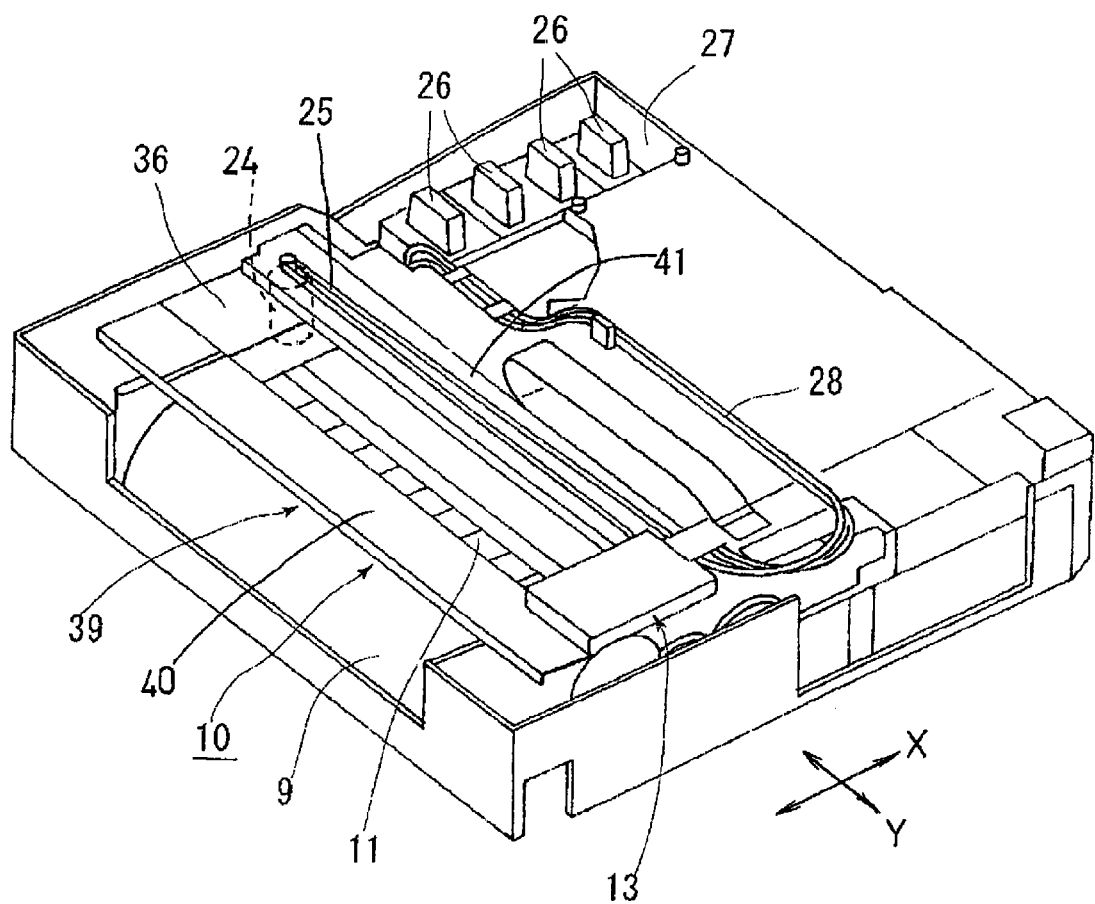
FIG. 4 is a perspective view from the bottom of a main casing of the image-recording device when the upper casing has been removed.
Figure 5:
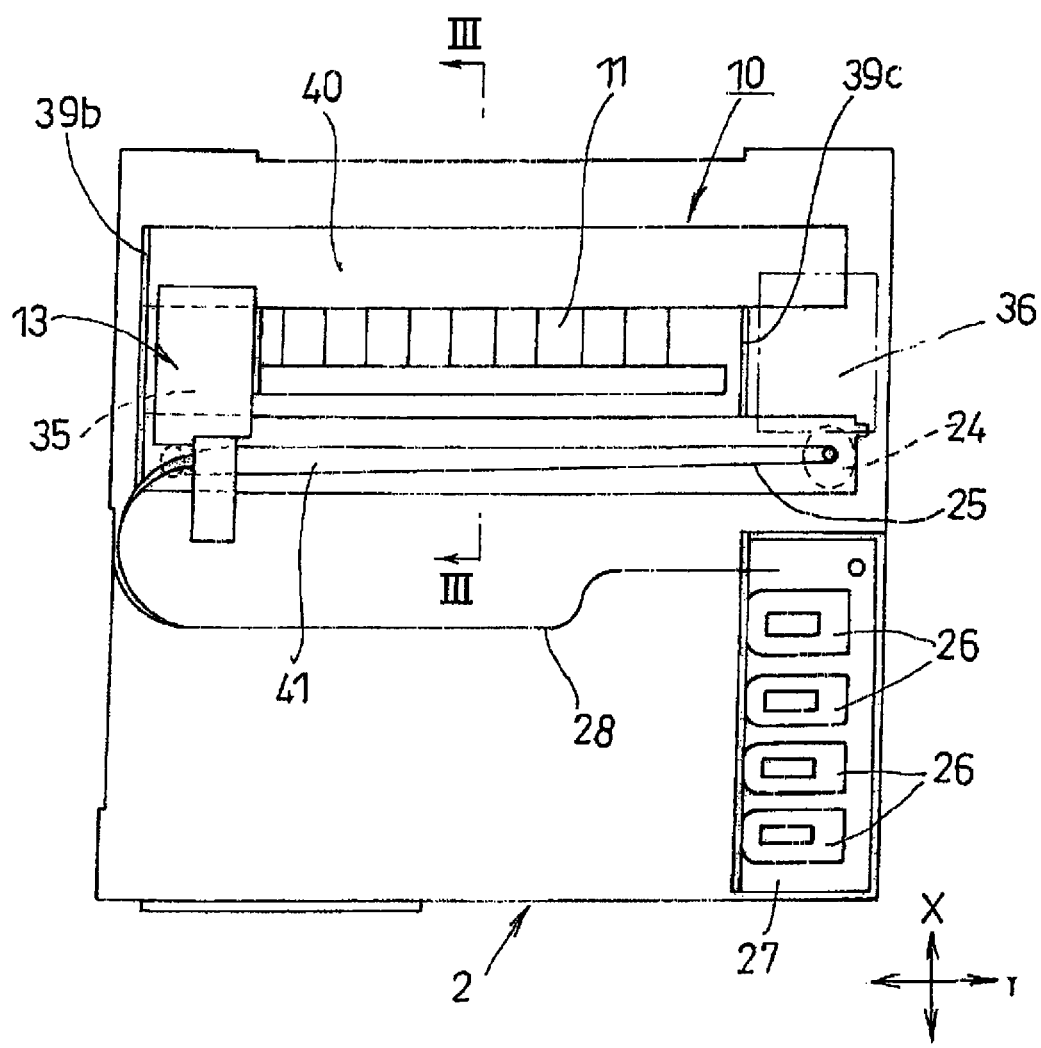
FIG. 5 is a plan view of the image-recording device shown in FIG. 4.

As shown in FIGS. 4 and 5, an accommodating section 27 is provided in the main casing 2 at a position near the inner surface of a side plate opposing and separated farthest from the side plate having above rotational axis of hinges or the like. Ink cartridges 26 for supplying ink to the inkjet recording head 12 for color recording are detachably mounted in the accommodating section 27 from above. The ink cartridges 26 accommodate ink in a plurality of colors. In the preferred embodiment, the ink cartridges 26 accommodate ink in the four colors black, cyan, magenta, and yellow, but the ink cartridges 26 may also be provided to accommodate ink of a larger number of colors. Flexible ink tubes 28 connect the ink cartridges 26 to the inkjet recording head 12 for supplying ink thereto.

The timing belt 25 is looped around pulleys 25a and 25b (see FIG. 8) so as to extend in the main scanning direction (Y direction) over the top surface of the guide plate 41, which is disposed on the downstream side in the paper-conveying direction (indicated by an arrow A) among the guide plates 40 and 41. The carriage 13 supporting the inkjet recording head 12 is coupled to a portion of the timing belt 25. The carriage 13 is provided with a first engaging step 13a and a second engaging step 13b (see FIG. 12).

A linear encoder (encoder strip) 37 (see FIG. 8) is provided on the top surface of the guide plate 41 extending in the longitudinal direction (main scanning direction) for detecting the position and movement of the carriage 13 in the Y direction (main scanning direction). A detection surface of the strip-like linear encoder 37 formed of slits provided at regular intervals in the Y direction, the slits extend in the orthogonal direction to the Y direction.

Figure 6:
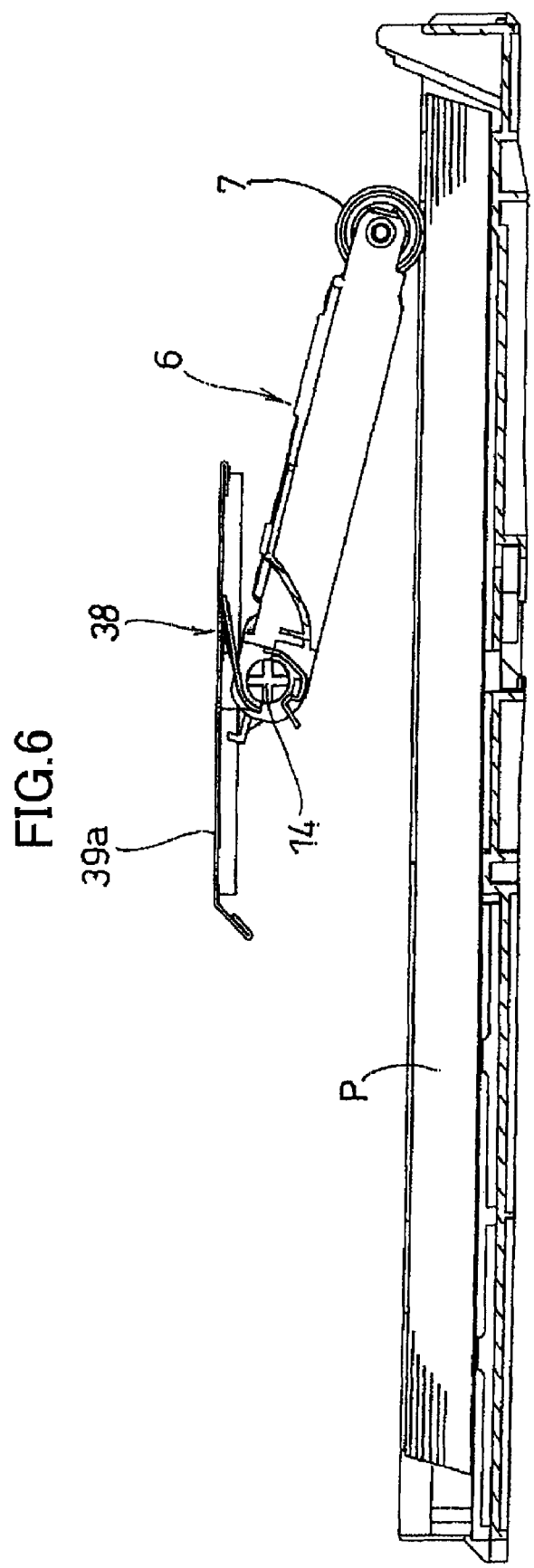
FIG. 6 is a side view of the paper cassette and a feeding unit.

As shown in FIGS. 3 and 6, the feeding unit 6 includes a feeding arm 6a rotatably disposed on a drive shaft 14. The platen 11 disposed on the main body 39a of the engine frame 39 functions to halt the rotation of the drive shaft 14 and the feeding arm 6a of the feeding unit 6 and also to support the paper P in a position opposing the bottom surface of the inkjet recording head 12. The space between the bottom surface of the inkjet recording head 12 and the platen 11 corresponds to an image-recording section in the claims. A torsion spring 38 is provided for constantly urging the feeding arm 6a in a downward rotation. A gear train 50 is disposed on the feeding arm 6a of the feeding unit 6. The gear train 50 includes a plurality of meshed gears for transmitting a rotational force of the drive shaft 14 to the feeding roller 7.

Figure 7:
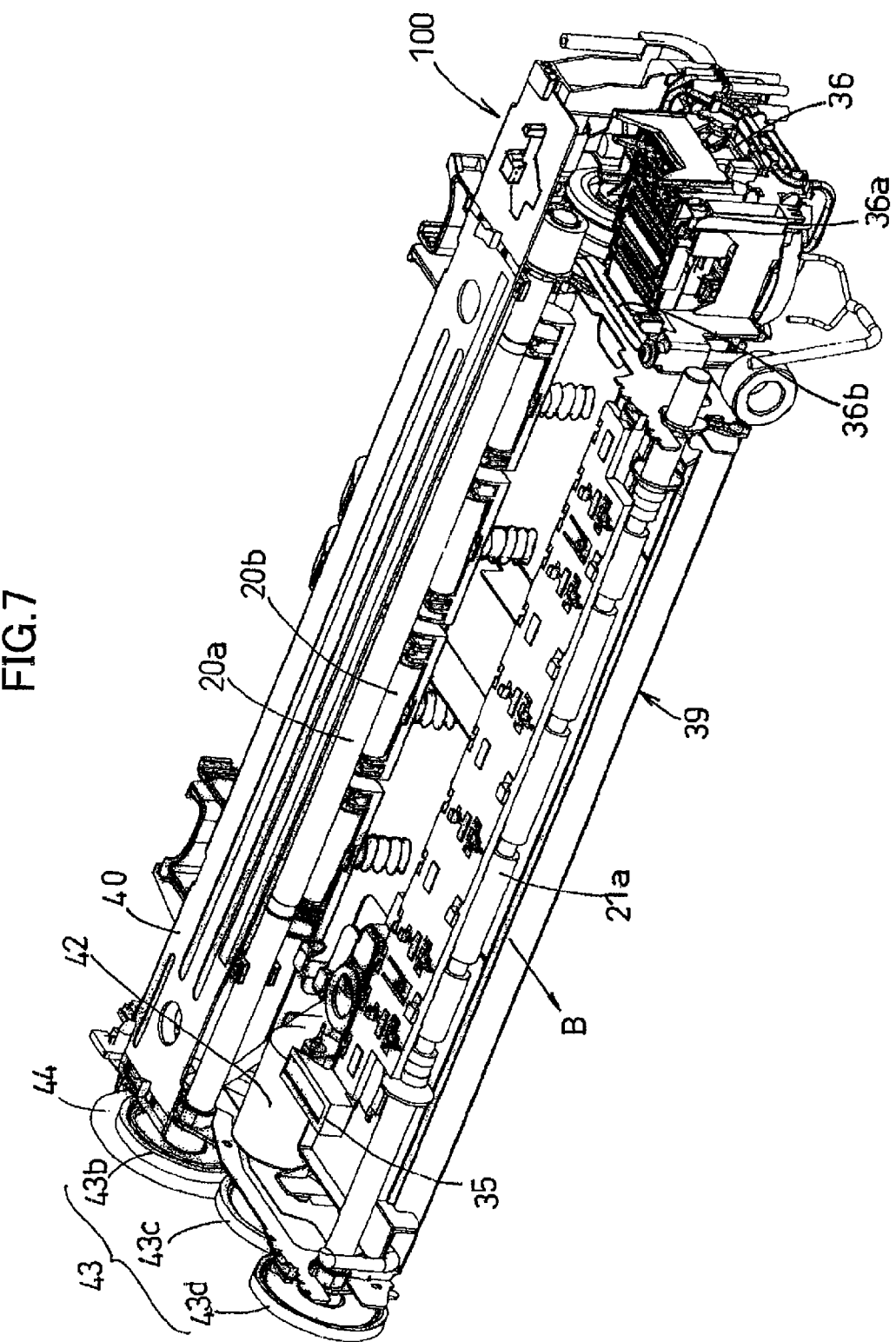
FIG. 7 is a perspective view of the recording unit without a platen and a guide plate on the downstream side.

As shown in FIGS. 3 and 7, a pair of registration rollers (conveying rollers) 20 is disposed on the upstream side of the platen 11 in the conveying direction for conveying the paper P to the image-recording section. The registration rollers 20 include a registration roller 20a and a follow roller 20b positioned below the registration roller 20a. The registration rollers 20 pinch the paper with the registration roller 20a contacting the top surface of the paper P and the follow roller 20b contacting the bottom surface of the paper.

A pair of discharge rollers 21 is disposed on the downstream side of the platen 11 in the conveying direction for conveying the paper toward a discharge section (in a direction indicated by an arrow B). The discharge rollers 21 include a discharge roller 21a, and a spur roller 21b. The discharge rollers 21 pinch the paper with the discharge roller 21a contacting the bottom surface of the paper and the spur roller 21b contacting the top surface of the paper P.

The engine frame 39 includes a pair of side plates 39b and 39c having shaft support parts for rotatably supporting both ends of the registration roller 20a and discharge roller 21a.

Figure 8:
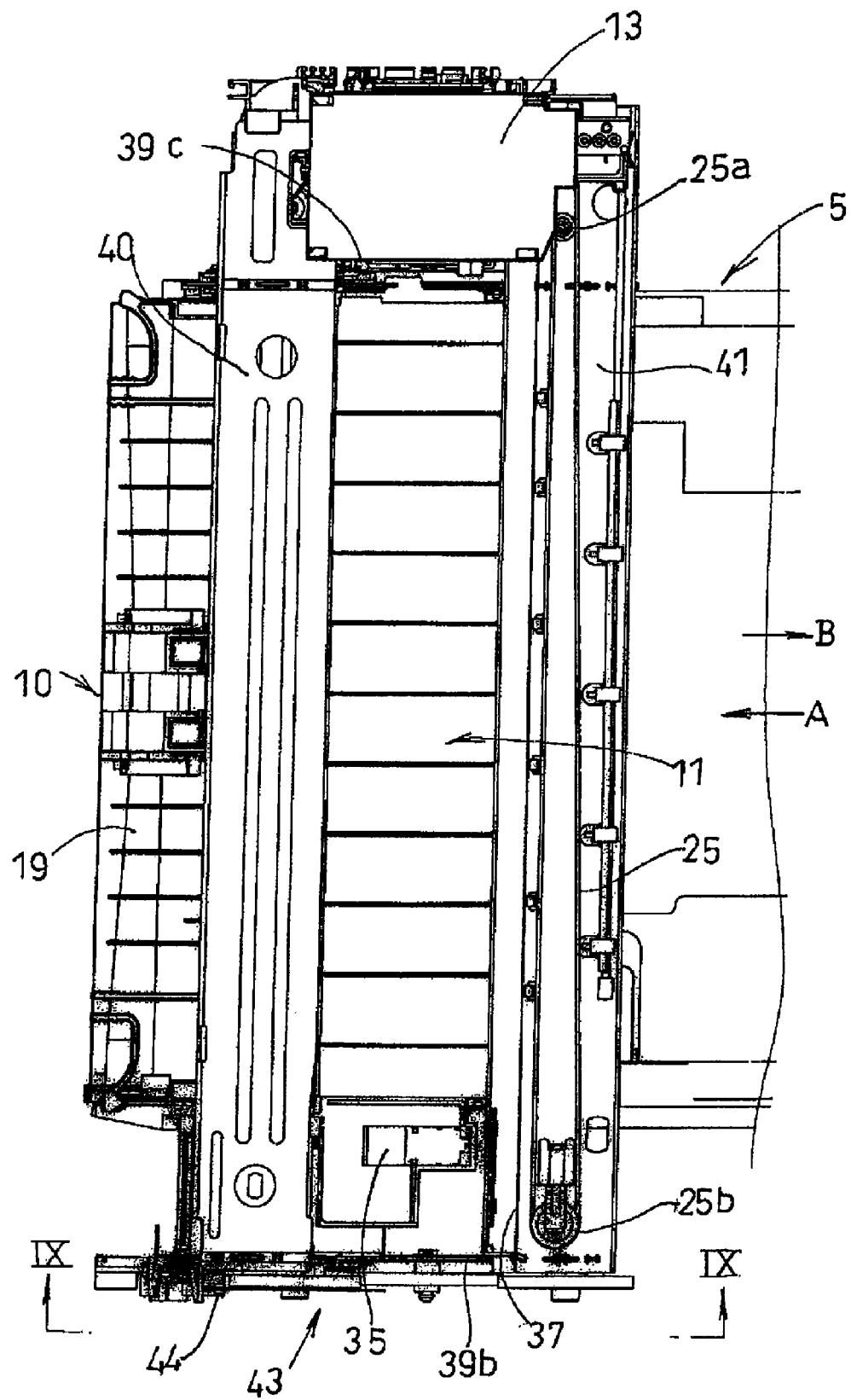
FIG. 8 is a plan view with a partial cutout showing the paper cassette mounted in the recording unit.

As shown in FIGS. 7 and 8, an ink receiving part 35 and a maintenance section 36 are disposed in sides of the main casing 2 relative to the Y direction at positions beyond the width of the conveyed paper (short side of the paper). The ink receiving part 35 is disposed on one end (side plate 39b end), and the maintenance section 36 on the other end (side plate 39c end). Periodically, the inkjet recording head 12 is moved to a flushing position over the ink receiving part 35 and ejects ink to prevent the nozzles from clogging. The ink receiving part 35 receives the discharged ink in this flushing operation.

Figure 9:
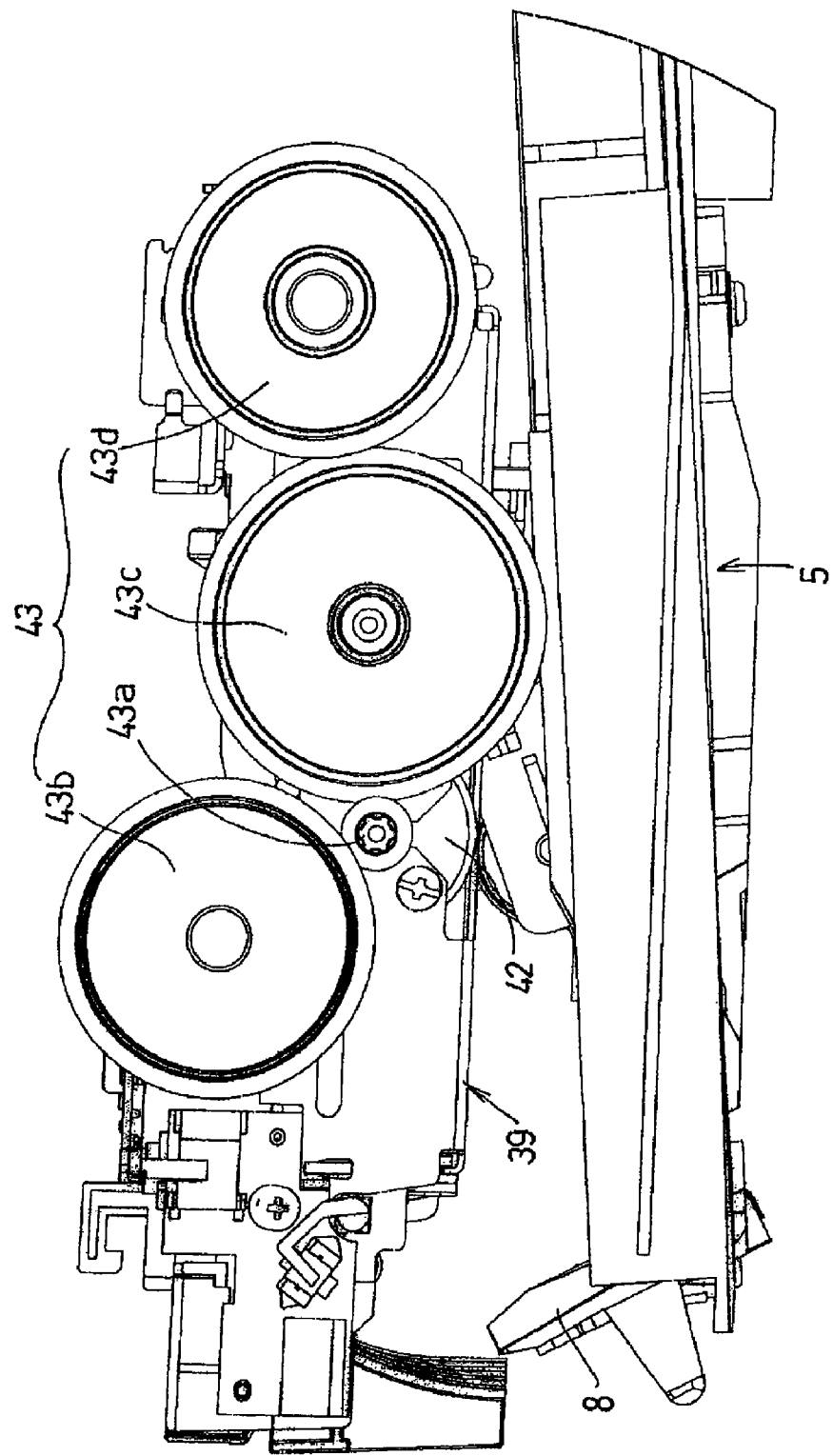
FIG. 9 is an enlarged cross-sectional view along a line IX-IX shown in FIG. 8.

As shown in FIGS. 7-9, a single common drive motor (linefeed motor) 42 capable of rotating forward and in reverse for conveying the paper is disposed near the side plate 39b, and a prescribed gear train 43 is provided near the side plate 39b for transmitting the drive force from the linefeed motor 42 to the registration roller 20a, the discharge roller 21a, and the maintenance section 36. As shown in FIG. 9, the gear train 43 includes a pinion 43a mounted on a drive shaft of the linefeed motor 42, a transmission gear 43b and an intermediate gear 43c engaged on the left and right sides of the pinion 43a, and a transmission gear 43d engaged with the intermediate gear 43c. As shown in FIG. 7, the transmission gear 43b is mounted on the left end of the registration roller 20a, while the transmission gear 43d is mounted on the left end of the discharge roller 21a. A rotary encoder 44 is also provided on part of the gear train 43 for detecting a distance in which the registration rollers 20 convey the paper P.

Figure 10:
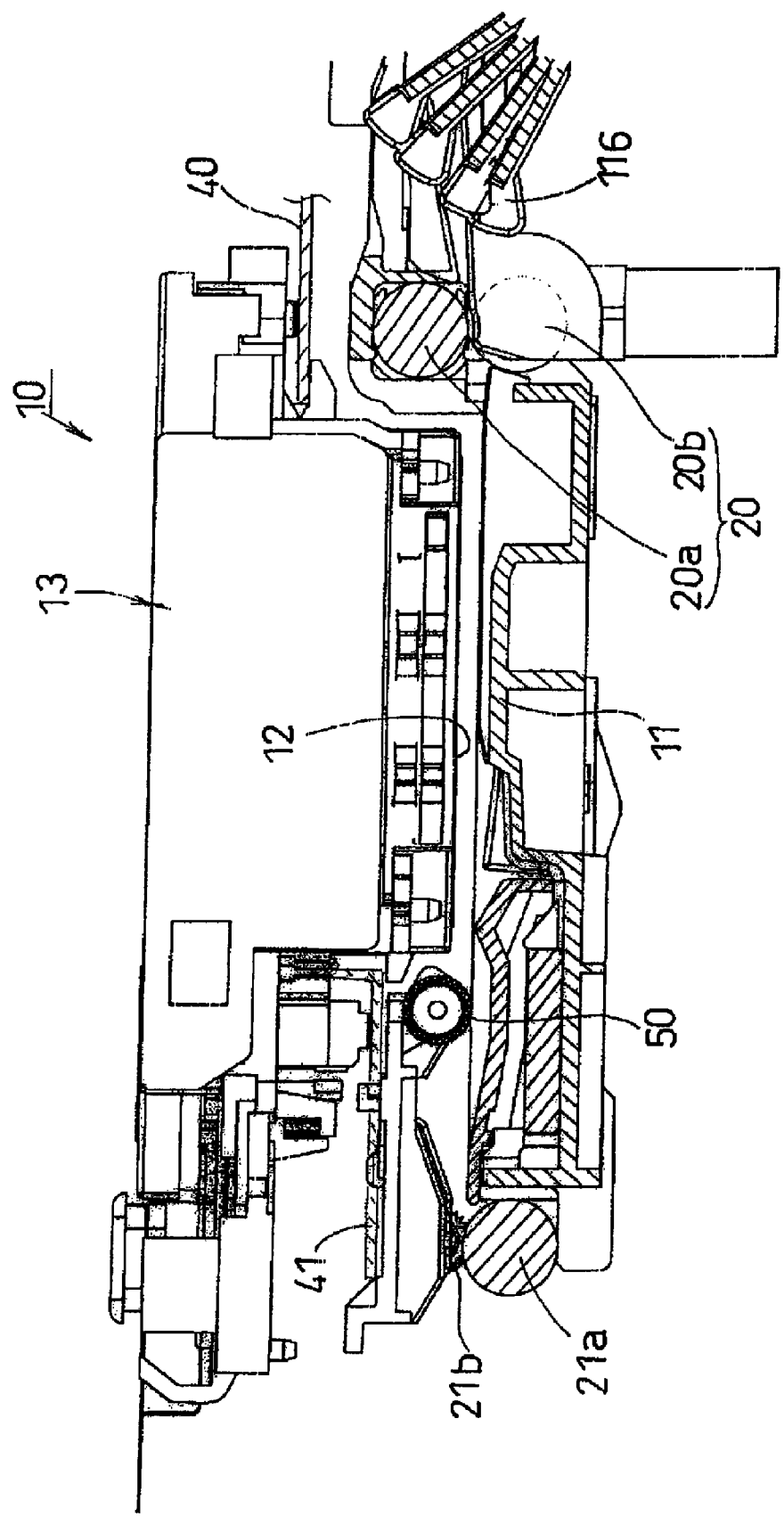
FIG. 10 is an enlarged cross-sectional view of the image-recording section.

As shown in FIG. 10, a paper sensor 116 is disposed on the upstream side of the registration rollers 20 in the conveying direction for detecting the leading and trailing edge positions of the paper P when the paper P is fed through the U-shaped section 9 toward the image-recording section. A registration sensor 117 (see FIG. 13) is also disposed downstream of the U-shaped section 9 in the conveying direction as a paper sensor that works in association with the paper sensor 116.

The spur gear 50 is also provided on the downstream side of an image-recording region corresponding to the nozzle surface of the inkjet recording head 12 and on the upstream side of the discharge rollers 21, in a region contacting the top surface of the platen 11. The spur gear 50 prevents the paper P on which an image has just been recorded from floating upward and sliding-against the nozzle surface of the inkjet recording head 12, thereby preventing a decline in image quality due to ink smeared by the nozzle surface.

Figure 11:
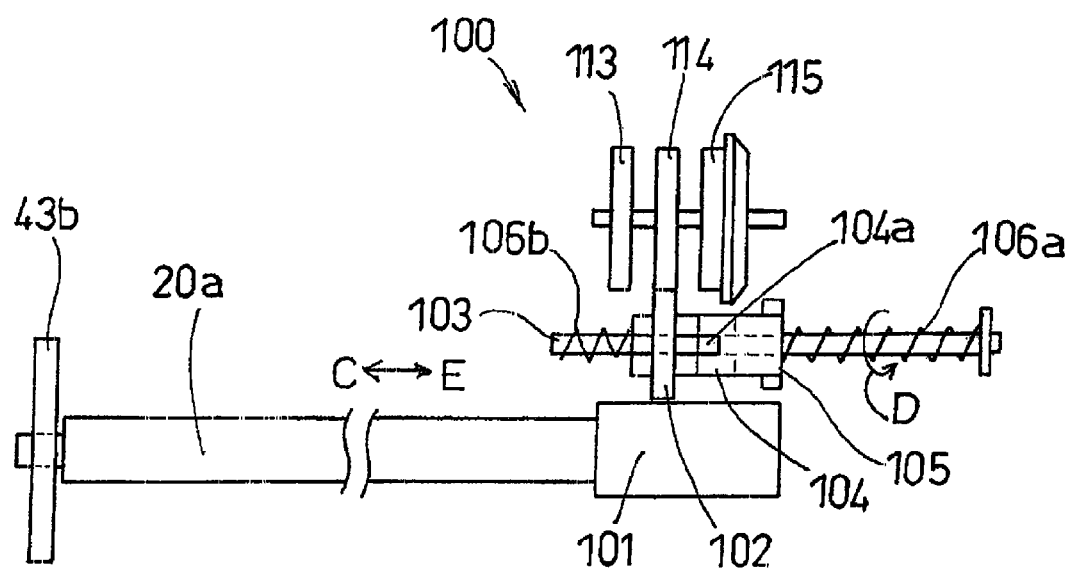
FIG. 11 is an explanatory diagram conceptually illustrating a drive transmission switch.

In the preferred embodiment, the linefeed motor 42 is configured of a DC motor that provides a rotating force to an end of the registration roller 20a. As shown in FIG. 11, a drive transmission switch 100 is disposed on the maintenance section 36. The drive transmission switch 100 selectively transmits the drive force from the other end of the registration roller 20a to the feeding roller 7 of the feeding unit 6 and a maintenance mechanism (not shown in detail) of the maintenance section 36.

As described above, the registration roller 20a is disposed in an upper side of the paper-conveying path and the discharge roller 21a in a lower side of the paper-conveying path. When the linefeed motor 42 is driven to rotate in a prescribed direction, the registration roller 20a and discharge roller 21a rotate in opposite directions relative to one another.

Next, the structure of a drive transmission unit and the drive transmission switch 100 for transmitting a drive force to the feeding unit 6 and the maintenance section 36 will be described while referring to FIG. 7 and FIGS. 11-12B. The drive transmission switch 100 is capable of switching between a maintenance mode for transmitting a drive force to only the maintenance section 36, and an intermittent feeding mode and a continuous feeding mode for driving the feeding roller 7 of the feeding unit 6. In the preferred embodiment, "mode" denotes a driving state that is continuous as long as the drive transmission switch 100 is not switched.

The continuous feeding mode is a mode for continuously driving the registration roller 20a of the registration rollers 20 and the feeding roller 7 to rotate in the forward direction in which the paper P is conveyed from the paper cassette 5 toward the inkjet recording head 12. The intermittent feeding mode is a mode for driving the feeding roller 7 to rotate forward for feeding a sheet of the paper P while driving the registration roller 20a to rotate in reverse for temporarily halting the paper P and subsequently for driving the registration roller 20a in the forward direction for conveying the paper P while driving the feeding roller 7 to rotate in reverse.

As described above, the rotating force of the linefeed motor 42 is transferred to the registration roller 20a via the transmission gear 43b. As shown in FIG. 11, a single long drive gear 101 in the drive transmission switch 100 is provided on the right end (maintenance section 36 end) of the registration roller 20a and rotates together with the same. A switching gear 102 is constantly engaged with the drive gear 101. The switching gear 102 is capable of sliding over a support shaft 103 extending parallel to the axis of the registration roller 20a.

A first block 104 is slidably and rotatably fitted over the support shaft 103. The first block 104 includes an upwardly extending contact piece 104a. A second block 105 is also slidably fitted over the support shaft 103 adjacent to the first block 104 can separate from the switching gear 102. A first urging spring 106a and a second urging spring 106b are also fitted over the support shaft 103.

The first urging spring 106a fitted over the support shaft 103 presses the second block 105 in a direction C indicated in FIG. 11, while the second urging spring 106b fitted over the support shaft 103 presses the switching gear 102 in a direction E indicated in FIG. 11. The urging force of the first urging spring 106a is set greater than that of the second urging spring 106b.

An endface cam part (not shown) sloped relative to the axis of the support shaft 103 is formed on the opposing surfaces of the first and second blocks 104 and 105. When the second block 105 pushes the first block 104 in the C direction, the contact piece 104a is configured to rotate in a direction D indicated in FIG. 11 (on the near side in FIG. 12).

Figure 12B:
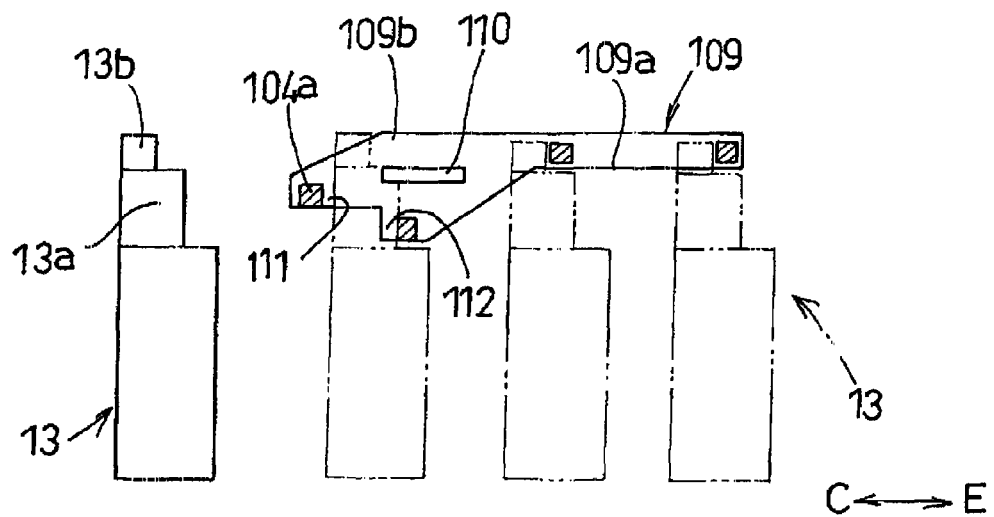
FIG. 12A is a front view and FIG. 12B is a plan view illustrating a mode switching function of the drive transmission switch.

Next, the drive transmission switching operation will be described with reference to FIGS. 12A and 12B. The carriage 13 can receive the contact piece 104a on either the first engaging step 13a or the second engaging step 13b. Movement of the carriage 13 moves the contact piece 104a, which in turn slides the switching gear 102, first block 104, and second block 105 over the support shaft 103.

Figure 12A:
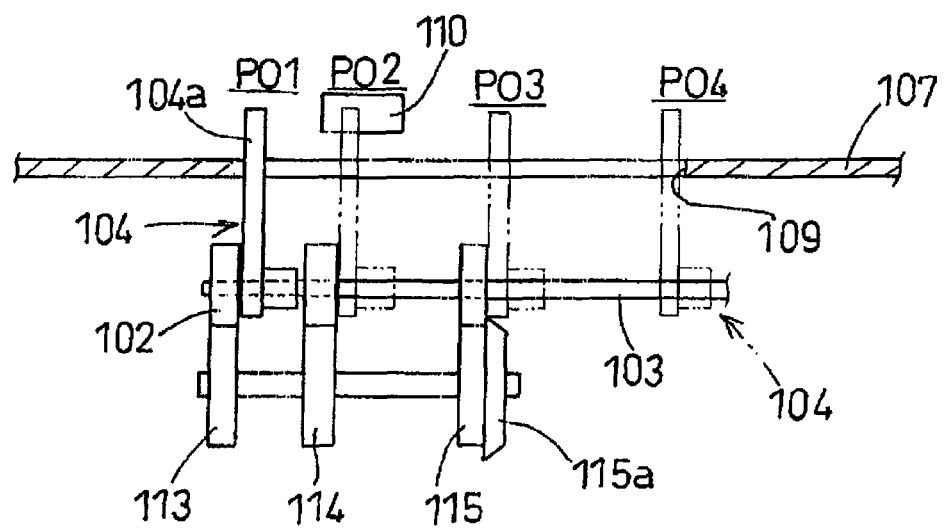

As shown in FIG. 12A, a plate-shaped guide block 107 is disposed above the first block 104. The guide block 107 has a guide groove 109 which a distal end of the contact piece 104a can penetrate vertically. As shown in FIG. 12B, the guide groove 109 includes a straight groove part 109a extending in the C and E directions, and a circular groove part 109b in communication with the left end of the straight groove part 109a. In the preferred embodiment, a restricting piece 110 opposes the center region of the circular groove part 109b and extends downward from a position above the guide block 107. The restricting piece 110 follows the straight groove part 109a. A step-like first setting part 111 and a step-like second setting part 112 are provided in the circular groove part 109b.

When the carriage 13 moves far away from the maintenance section 36 in the C direction and is in a recording region for recording on the paper P, the first urging spring 106a pressing against the second block 105 in the C direction causes the first block 104 and switching gear 102 to move along the support shaft 103 At this time, the contact piece 104a of the first block 104 becomes positioned in the first setting part 111. This position is referred to as position 1 (Po1). At this time, the switching gear 102 is engaged with an intermittent feeding transmission gear 113.

Next, when the carriage 13 moves from Po1 toward the maintenance section 36 in the E direction, the first engaging step 13a of the carriage 13 presses against the contact piece 104a. When the contact piece 104a becomes positioned in the second setting part 112 (which position will be referred to as position 2, or Po2), the switching gear 102 engages with a continuous feeding transmission gear 114.

As the carriage 13 moves farther from the Po2 in the E direction, the first engaging step 13a continues to push the contact piece 104a toward the straight groove part 109a along the continuously sloped surface of the circular groove part 109b. When the contact piece 104a enters the initial portion of the straight groove part 109a (which position will be referred to as position 3, or Po3), the contact piece 104a becomes engaged with the second engaging step 13b of the carriage 13. At this time, the switching gear 102 is engaged with a maintenance transmission gear 115.

The switching gear 102, intermittent feeding transmission gear 113, continuous feeding transmission gear 114, and maintenance transmission gear 115 are all spur gears, but the maintenance transmission gear 115 has a large-diameter bevel gear 115a integrally provided on the side surface thereof that rotates together with the maintenance transmission gear 115.

Po3 is used both as a standby position and a maintenance position. In this position, a cap part 36a (see FIG. 7) of the maintenance section 36 covers the bottom nozzle surface of the inkjet recording head 12. In this maintenance position, a recovery process and the like are performed by driving the linefeed motor 42 and activating a suction pump (not shown) to selectively draw ink out from the nozzles in the inkjet recording head 12 and to remove air bubbles from a buffer tank (not shown) on the inkjet recording head 12. When the carriage 13 is moved laterally from the maintenance section 36 to the image-recording region (leftward in FIG. 8), a cleaner (wiper blade) 36b wipes the nozzle surface of the recording head 12. When the power to the image-recording device 1 is off, the carriage 13 is halted in a position over the top surface of the maintenance section 36 (Po3), at which time the cap part. 36a on the top surface of the maintenance section 36 covers and hermetically seals the nozzles in the recording head 12. The nozzles are also covered and hermetically sealed by the cap part 36a in the home position (position of origin).

When the carriage 13 is moved farther from Po3 in the E direction, the side surface of the switching gear 102 contacts the bevel gear 115a and is prevented from moving farther in the E direction. Therefore, the first block 104 separates from the single switching gear 102, and the single switching gear 102 remains engaged with the maintenance transmission gear 115. The contact piece 104a is pushed by the second engaging step 13b of the carriage 13 to a position at the end (right end in FIG. 12B) of the straight groove part 109a. This is position 4 (Po4) and is commonly referred to as the home position (position of origin).

When the carriage 13 moves in reverse, that is, in the C direction from Po4 and the contact piece 104a shifts from the straight groove part 109a to the circular groove part 109b, the first engaging step 13a receives the contact piece 104a and prevents the contact piece 104a from sliding along the continuous sloped surface. Therefore, shown in FIG. 12B, the contact piece 104a moves leftward while sliding along the restricting piece 110, and subsequently slides along the left sloped surface of the circular groove part 109b and arrives at the left end of the circular groove part 109b, and once again engage in the first setting part 111. In this way, the contact piece 104a can move in a cycle.

As described above, in Po1 the contact piece 104a is positioned in the first setting part 111 and held in this position by the urging of the first urging spring 106a in the C direction, Similarly, in Po2 the contact piece 104a is positioned and held in the second setting part 112, one step lower than the first setting part 111. In this way, the first block 104 can be temporarily held in a prescribed position, after which the carriage 13 can be returned to the image-recording region and dedicated to an image-recording operation. Therefore, it is not necessary to move the carriage 13 from the image-recording region to the drive transmission switch 100 outside of the image-recording region each time the registration operation is performed, as in the conventional technology, achieving an overall rapid image-recording operation in the precision recording (intermittent feeding) mode.

Figure 13A:
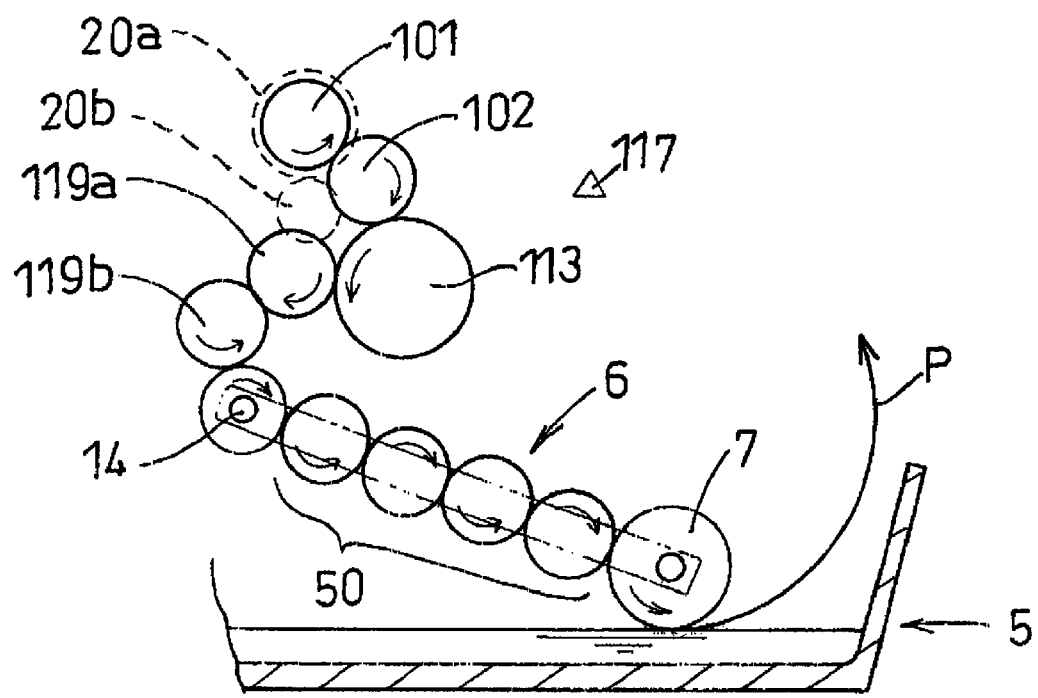
FIG. 13A is an explanatory diagram illustrating the transmission of a drive force for feeding paper in an intermittent feeding mode (first mode)
Figure 13B:
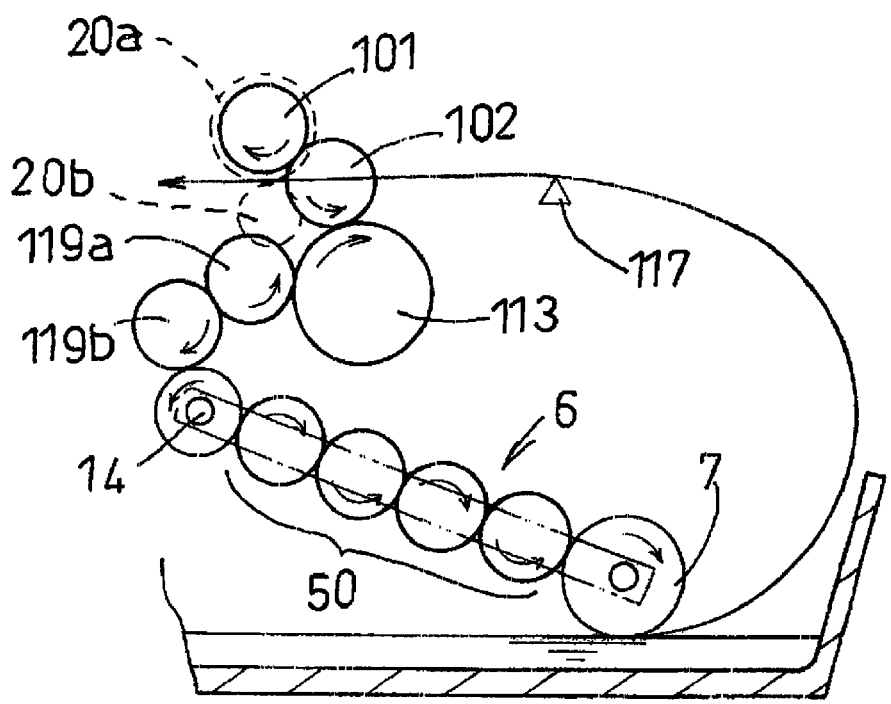
FIG. 13B is an explanatory diagram illustrating the transmission of a drive force during image recording.

As shown in FIGS. 13A and 13B, at Po1 in which the switching gear 102 is engaged with the intermittent feeding transmission gear 113, a drive force is transmitted from the registration roller 20a to the drive shaft 14 on the base end of the feeding arm 6a via two intermediate gears 119a and 119b. This drive force rotates the feeding roller 7 via the gear train 50.

As shown in FIG. 13A, at Po1 in which the switching gear 102 is engaged with the intermittent feeding transmission gear 113, a drive force from the registration roller 20a is transmitted to the gear teeth of the drive shaft 14 via the intermediate gears 119a and 119b. When the linefeed motor 42 is driven to rotate in reverse in this state, the registration roller 20a of the registration rollers 20 rotates in reverse (counterclockwise in FIG. 13A) This drive force transmitted to the feeding roller 7 via the gear train 50 in the feeding arm 6a drives the feeding roller 7 to rotate in the feeding direction (a forward rotation; counterclockwise in FIG. 13A).

As a result, a plurality of sheets of the paper P stacked in the paper cassette 5 are fed against the sloped separation surface 8, which separates the paper P so that only the topmost sheet is conveyed along the U-shaped section 9. Since the registration roller 20a of the registration rollers 20 is rotating in reverse (counterclockwise in FIG. 13A) at this time, the leading edge of the paper P collides against the nip part between the follow roller 20b and the registration roller 20a, receiving a registration effect to correct any skew in the paper.

When the linefeed motor 42 is rotated in the forward direction, as shown in FIG. 13B, the registration roller 20a rotates forward (clockwise in FIG. 13B). When the paper P is interposed at the nip part between the follow roller 20b and the registration roller 20a at this time, the registration roller 20a conveys the paper P downstream of the paper cassette 5. A cuing operation is performed to convey the leading edge of the paper P pinched between the registration rollers 20 past the paper sensor 116 to a prescribed position in the image-recording section in order to set the paper P in a recording start position.

At this time, the feeding roller 7 rotates in reverse (clockwise in FIG. 13B), that is, in the direction opposite the feeding direction, but the paper conveyed by the registration rollers 20 slips along the peripheral surface of the feeding roller 7 because the nip force between the registration rollers 20 is set, greater than the conveying force generated by the feeding roller 7 (a paper gripping force of the feeding roller 7 generated by a force in which the torsion spring 38 presses the feeding roller 7 against the paper and the like), producing a release effect in which the feeding arm 6a pivots upward about the drive shaft 14.

Figure 14A:
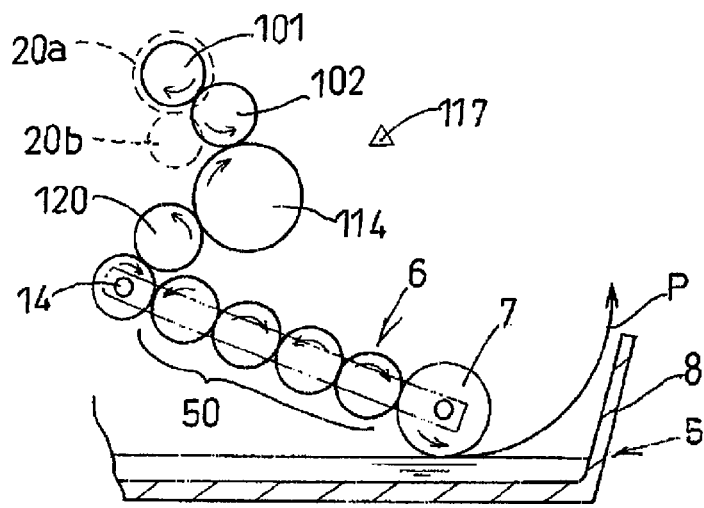
FIG. 14A is an explanatory diagram illustrating the transmission of a drive force for feeding paper in a continuous feeding mode (second mode)
Figure 14B:
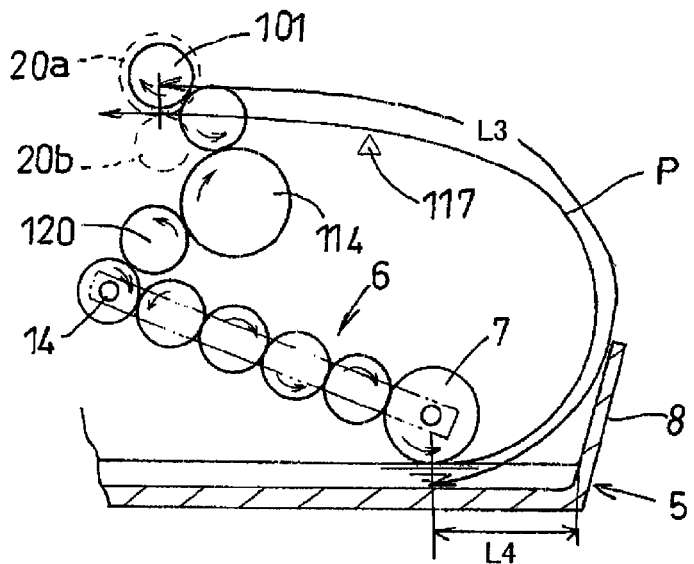
FIG. 14B is an explanatory diagram illustrating the transmission of a drive force during image recording.
Figure 14C:
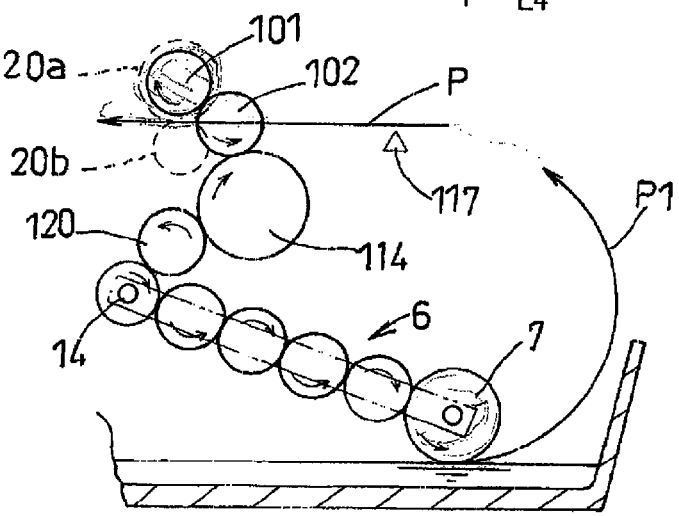
FIG. 14C is an explanatory diagram illustrating the transmission of a drive force when feeding a succeeding sheet of paper.

As shown in FIGS. 14A-14C, at Po2 the switching gear 102 is engaged with the continuous feeding transmission gear 114 for transmitting a drive force to the drive shaft 14 disposed at the end of the feeding arm 6a via a single intermediate gear 120. The drive force is transmitted from the drive shaft 14 to the feeding roller 7 via the gear train 50 for rotating the feeding roller 7.

When the linefeed motor 42 is rotated forward while the switching gear 102 is engaged with the continuous feeding transmission gear 114, the registration roller 20a is rotated forward (clockwise in FIG. 14A) to rotate the feeding roller 7 in the forward direction, that is, the feeding direction. Accordingly, only the topmost sheet of paper P is separated and conveyed along the U-shaped section 9. As shown in FIG. 14B, when the leading edge of the paper P reaches the nip part between the registration roller 20a and follow roller 20b, the registration rollers 20 immediately grip the paper P at the nip part and begin conveying the paper P above the paper cassette 5, so that the paper P does not receive the registration effect.

FIG. 15 is a block diagram showing the primary electrical structure of the image-recording device 1 as a controller. As shown in FIG. 15, the image-recording device 1 includes a CPU 300, a ROM 301, a RAM 302, and a EEPROM 303 that are all connected to an ASIC (application specific integrated circuit) 306 via a bus 305.

The CPU 300 is a central processing unit that controls overall operations of the image-recording device 1. The ROM 301 is a non-rewritable memory storing various control programs and data required by the CPU 300 when executing the control programs. The RAM 302 temporarily stores programs and data required for various processes executed by the CPU 300.

The ASIC 306 is also connected to the NCU 317 having a modem 318. A communication signal received by the NCU 317 from a public network is first demodulated by the modem 318 and then inputted into the ASIC 306. Further, when the ASIC 306 transmits image data externally for a facsimile transmission or the like, the modem 318 modulates the image data to produce a communication signal and outputs this signal to the public network via the NCU 317.

In addition, the ASIC 306 generates a phase excitation signal or the like for energizing the linefeed motor 42, for example, based on commands from the CPU 300 and applies this signal to a first drive circuit 311 of the linefeed motor 42 and a second drive circuit 312 of the carriage motor 24, thereby supplying a drive signal to the linefeed motor 42 and carriage motor 24 via the first drive circuit 311 and the second drive circuit 312 for controlling the forward and reverse rotations of the linefeed motor 42 and carriage motor 24, halting the motors, and the like.

The ASIC 306 is also connected to the panel interface 313 for facilitating transmission and reception operations with the keyboard 30a and the LCD 31 of the control panel 30, and the parallel interface 315 and USB interface 316 for exchanging data with a personal computer or other external device via a parallel cable or USB cable, respectively.

Further, the ASIC 306 is connected to a leaf switch 118 detecting rotational position of cum (not shown) in the maintenance unit 36, the paper sensor 117 related with the paper sensor 116, which positioned downstream of the registration roller 20a in the paper-conveying direction for detecting the leading and trailing edges of the recording paper P as the recording paper P is fed toward the printing position, the rotary encoder 44 for detecting rotational amounts of the registration roller 20a and the feeding roller 7, and the linear encoder 37 for detecting the amount that the carriage 13 moves in the main scanning direction and the current position of the same.

A third drive circuit 314 functions to selectively eject ink from the inkjet recording head 12 onto the paper P at a prescribed timing. The third drive circuit 314 receives signals generated in the ASIC 306 and outputted from the same based on a drive control procedure outputted from the CPU 300 to drive the inkjet recording head 12.

Next, a paper-feeding operation and an image-recording operation performed by the above controller will be described with reference to the flowchart in FIG. 16. Specifically, the controller performs a control process to switch the feeding state of the paper between a first mode and a second mode. In the first mode, paper is fed intermittently from the paper cassette 5 when recording images on a plurality of sheets. This mode is selected when giving priority to high-quality image recording. In the second mode, paper is fed continuously from the paper cassette 5 when recording a plurality of sheets. This mode is selected to emphasize high-speed recording.

Figure 16:
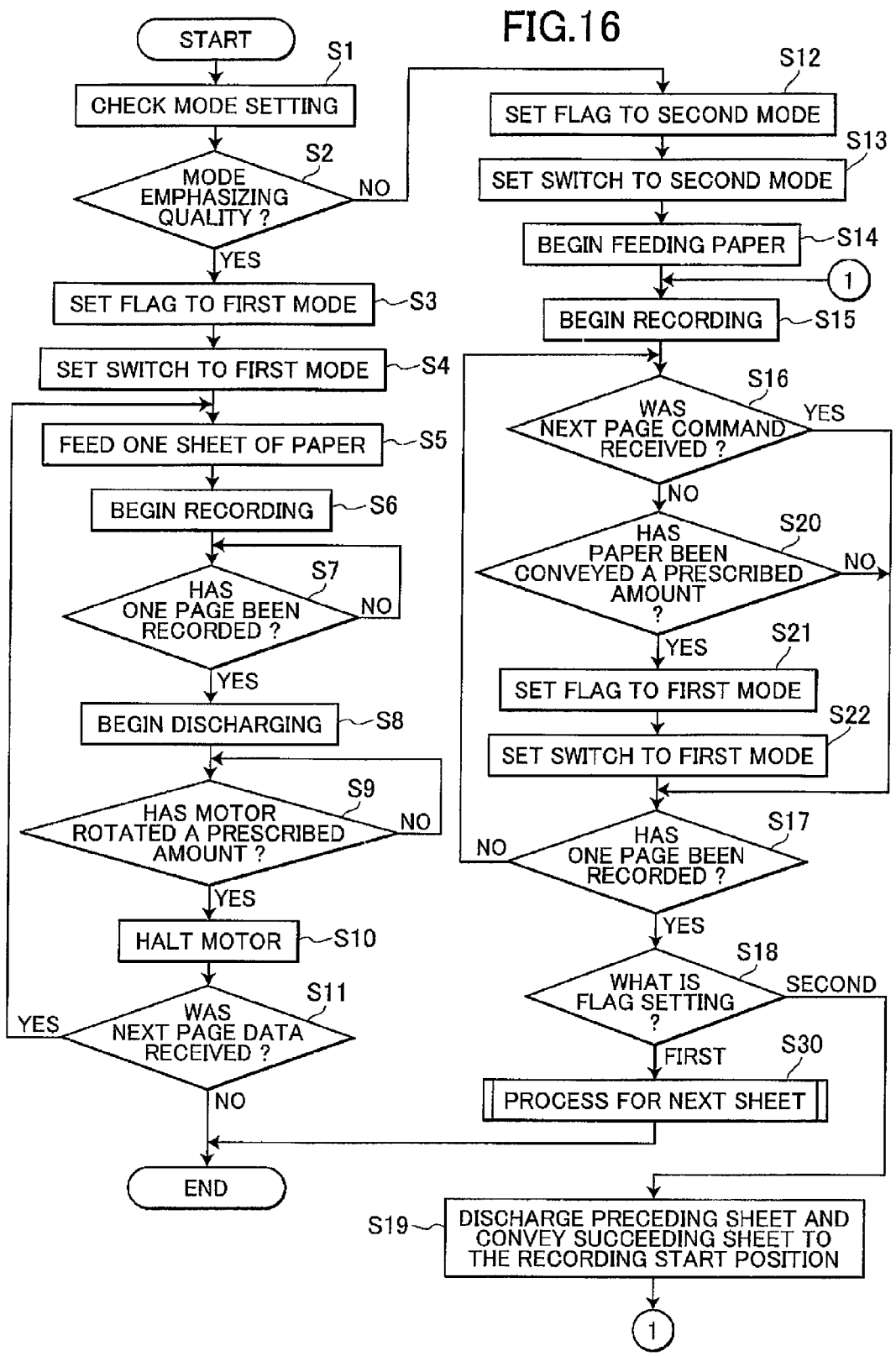
FIG. 16 is a flowchart illustrating steps in an image-recording operation.

The control process in FIG. 16 begins when the image-recording device 1 receives data transmitted from the PC 401 perceived to be an image-recording command. In S1 of FIG. 16, the CPU 300 of the controller determines whether the mode of the image-recording device 1 has been set to the first mode emphasizing quality. The first mode is useful for performing color printing of color photographs or the like by recording microdots of ink in a plurality of colors on the paper. In this mode, printing is performed on photo paper or the like while suppressing problems in color registration or irregularities in color tone.

The user can preset the first mode emphasizing quality by pressing a mode setting button (not shown) on the control panel 30 or by performing a remote operation from the PC 401. The CPU 300 can set this mode after determining that data transmitted from the PC 401 together with an image-recording command is a command for setting the first mode.

If the first mode emphasizing quality (intermittent feeding mode) has been set (S2: YES), then in S3 the CPU 300 stores a flag specifying the first mode in a prescribed region of the RAM 302. In S4 the CPU 300 sets the drive transmission switch 100 to the first mode. Consequently, the carriage 13 maintained in the standby position (Po3) is moved a great distance in the C direction in FIG. 12B toward the image-recording region. As a result, the contact piece 104*a* of the first block 104 is moved to the first setting part 111 so that the switching gear 102 engages with the intermittent feeding transmission gear 113 (Po1).

In S5 the controller feeds one sheet of the paper P. More specifically, the CPU 300 drives the linefeed motor 42 in reverse so that the feeding roller 7 is driven to rotate in the feeding direction for feeding the paper P toward the sloped separation surface 8. The topmost sheet of the paper P is separated by the sloped separation surface 8 and conveyed along the U-shaped section 9. The registration rollers 20 subsequently perform the cuing operation to set the sheet.

After the controller receives image-recording data from the PC 401, the CPU 300 begins recording an image on the paper P in S6. Specifically, the CPU 300 drives the linefeed motor 42 to rotate forward and advance the paper P intermittently. At the same time, the CPU 300 reciprocates the carriage 13 in the main scanning direction while controlling the inkjet recording head 12 to eject ink from the nozzles of the inkjet recording head 12 onto the top surface of the paper P.

The inkjet recording head 12 is provided with 93 nozzles aligned in the X direction for each of the colors C, M, Y, and Bk. When performing an operation to print an image at 300 dpi resolution on an A4-size paper P, for example, the inkjet recording head 12 ejects 300 dots of ink per inch from the nozzles while the carriage 13 reciprocates. The carriage 13 begins to reciprocate after the image-recording device 1 receives image data from the PC 401 equivalent to an image having a length in the X direction corresponding to the length of the nozzles in the inkjet recording head 12 in the Y direction corresponding to the width of the paper P. In other words, in S6 the image-recording device 1 begins an image-recording operation after receiving 460 kbits of image-recording data from the PC 401 per color, i.e., 93 (number of nozzles)×2 (scans in one reciprocation)×300 (dpi)×8.27 (inches in the width dimension of A4-size paper, 210 mm). When printing at 600 dpi resolution, the image-recording device 1 begins the image-recording operation after receiving twice as much image-recording data.

When the paper P is advanced intermittently, the controller drives the registration roller 20*a* and discharge roller 21*a* to rotate in the same direction (forward direction). During the cuing operation and image-recording operation, the drive shaft 14 is rotated in reverse so that the feeding arm 6*a* pivots upward and the feeding roller 7 rotates in reverse (clockwise in FIG. 13B).

Each time image-recording data of a sufficient data size is received thereafter, the controller reciprocates the carriage 13 and records an image on the advanced paper P. This process of receiving image data from the PC 401 and recording an image on the paper P is repeated until recording is completed for one sheet of paper (S7: NO).

When recording is completed for one sheet of paper (S7: YES), then in S8 the CPU 300 begins discharging the recorded paper P. At this time, the CPU 300 drives the linefeed motor 42 to continuously rotate the registration roller 20*a* and discharge roller 21*a* in the forward rotation. After the linefeed motor 42 has been driven an appropriate number of steps (S9: YES), in S10 the CPU 300 halts the linefeed motor 42.

In S11 the CPU 300 determines whether image-recording data exists for a succeeding sheet (the next page). If image-recording data exists (S11: YES), then the CPU 300 repeats the process from S5 to S11. In this way, the paper P is fed to the image-recording section one sheet at a time, and a precision image-recording process such as a process to record a color photo is executed.

In the process of S11 the CPU 300 may make a determination based on whether image-recording data is received from the PC 401 within a prescribed time period, or based on whether data indicating the end of image recording has been received from the PC 401. It is preferable to wait a sufficient amount of time before making this determination since the PC 401 may require time to generate the image-recording data.

Next, an image-recording operation performed in the second mode will be described. If the CPU 300 determines that the mode is not set to the first mode emphasizing quality (S2: NO), then in S2 the CPU 300 stores a flag indicating the second mode in a prescribed region of the RAM 302. In 513 the CPU 300 sets the drive transmission switch 100 to the second mode. In the second mode, a plurality of sheets of the paper P is fed continuously from the paper cassette 5. By setting the drive transmission switch 100 in the second mode, the switching gear 102 and continuous feeding transmission gear 114 are engaged.

Specifically, the carriage 13 halted in Po1 is moved a prescribed amount in the E direction, pressing and moving the contact piece 104*a* to the second setting part. 112 (Po2) so that, the switching gear 102 and continuous feeding transmission gear 114 are engaged.

In S14 the CPU :300 feeds a sheet of the paper P. In the second mode, the paper P is conveyed without receiving the registration effect, even when the leading edge of the paper P reaches the nip part between the registration rollers 20 (see FIG. 14B). In S15 the CPU 300 begins image recording by intermittently advancing the paper P while reciprocating the carriage 13 in the main scanning direction and controlling the inkjet recording head 12 to eject ink from the nozzles onto the surface of the paper P. In the second mode it is preferable that the ASIC 306 does not accept output signals (ON/OFF signals) from the registration sensor 117.

Although the sheet of paper P is pinched at the nip part between the registration roller 20*a* and follow roller 20*b* and is gripped by the feeding roller 7 (in other words, when a sheet of paper P spans between both nip parts, as shown in FIG. 14B), the paper P can be reliably conveyed to the image-recording section since the nip force between the registration roller 20*a* and follow roller 20*b* is greater than the conveying force of the feeding roller 7, and since the peripheral velocity of the registration roller 20*a* is set greater than that of the feeding roller 7.

Each time image-recording data of a sufficient data size is received thereafter, the controller reciprocates the carriage 13 and records an image on the advanced paper P. The process of receiving image data from the PC 401 and recording an image on the paper P is repeated until recording is completed for one sheet worth of paper. In other words, as long as one page of recording is not completed (S17: NO), as will be described below, the controller repeats the process from S16 to S22.

In S16 the CPU 300 determines whether a command has been received from the PC 401 indicating the existence of the next sheet (succeeding sheet of paper). The PC 401 transmits this command to indicate that there exist pages following the page currently being recorded.

If the controller receives a command from the PC 401 indicating the existence of a succeeding page (S16: YES), then the CPU 300 advances to S17 without changing the flag indicating the second mode.

However, if a command indicating the existence of a succeeding page has not been received (S16: NO), then it is likely that either there are, in fact, no successive pages or successive pages exist, but the PC 401 has not yet transmitted the command. Accordingly, in S20 the CPU 300 determines whether the current sheet undergoing recording or the next sheet following the current sheet has been conveyed a prescribed amount. This prescribed amount is a predetermined value set according to the structure of the image-recording device 1 and is preferably an amount that the controller can return the sheet currently being fed (the sheet following the sheet undergoing image recording) to the paper cassette through reverse rotation of the feeding roller. This will be described in greater detail below.

If the CPU 300 determines that the paper P has not been conveyed the prescribed amount (S20; NO), then the CPU 300 advances to S17. While the CPU 300 will determine that the paper has not been conveyed the prescribed amount immediately after the image-recording operation has begun (S20: NO), at some point the CPU 300 will determine that the paper has been conveyed the prescribed amount (S20: YES), provided that a command for a succeeding page has not been received, since the CPU 300 makes the determination in S20 regularly as image recording progresses. At this time, the CPU 300 assumes that, a succeeding page does not exist and initiates a procedure to end the continuous feeding.

Specifically, when the CPU 300 determines that the sheet has been conveyed the prescribed amount (S20: YES), then in S21 the CPU 300 switches the flag to the first mode. Next, the CPU 300 conveys the paper P positioned in the image-recording section a prescribed amount in the discharge direction equivalent to about three passes of linefeed width. The CPU 300 also issues a command to move the carriage 13 and to switch the drive transmission switch 100 to the first mode (Po1), thereby preventing a succeeding sheet of paper P1 from being fed after the sheet of paper P currently undergoing image recording.

Once the image-recording operation on the preceding sheet of paper P is completed by repeating the process in S16-S22 (S17: YES), in S18 the CPU 300 checks the current state of the flag. If the flag is set to the second mode (S18: $2^{nd}$), then in S19 the CPU 300 continues to drive the linefeed motor 42 continuously in the forward direction for rotating the registration roller 20*a*, discharge roller 21*a*, and feeding roller 7 in the forward direction in order to discharge the preceding sheet of paper P and to convey the succeeding sheet of paper P1 to the recording start position (see FIG. 14C). Next, the CPU 300 returns to S15 to begin an image-recording operation on the succeeding sheet of paper P1. By continuously feeding and conveying the plurality of sheets of paper without temporarily halting the paper at the registration rollers 20 in this way, the image-recording device 1 can perform high-speed image-recording operations.

However, when the CPU 300 determines in S18 that the flag is set to the first mode (S18: $1^{st}$), then in S30 the CPU 300 performs a process for the next sheet of paper (succeeding sheet of paper).

Figure 17:
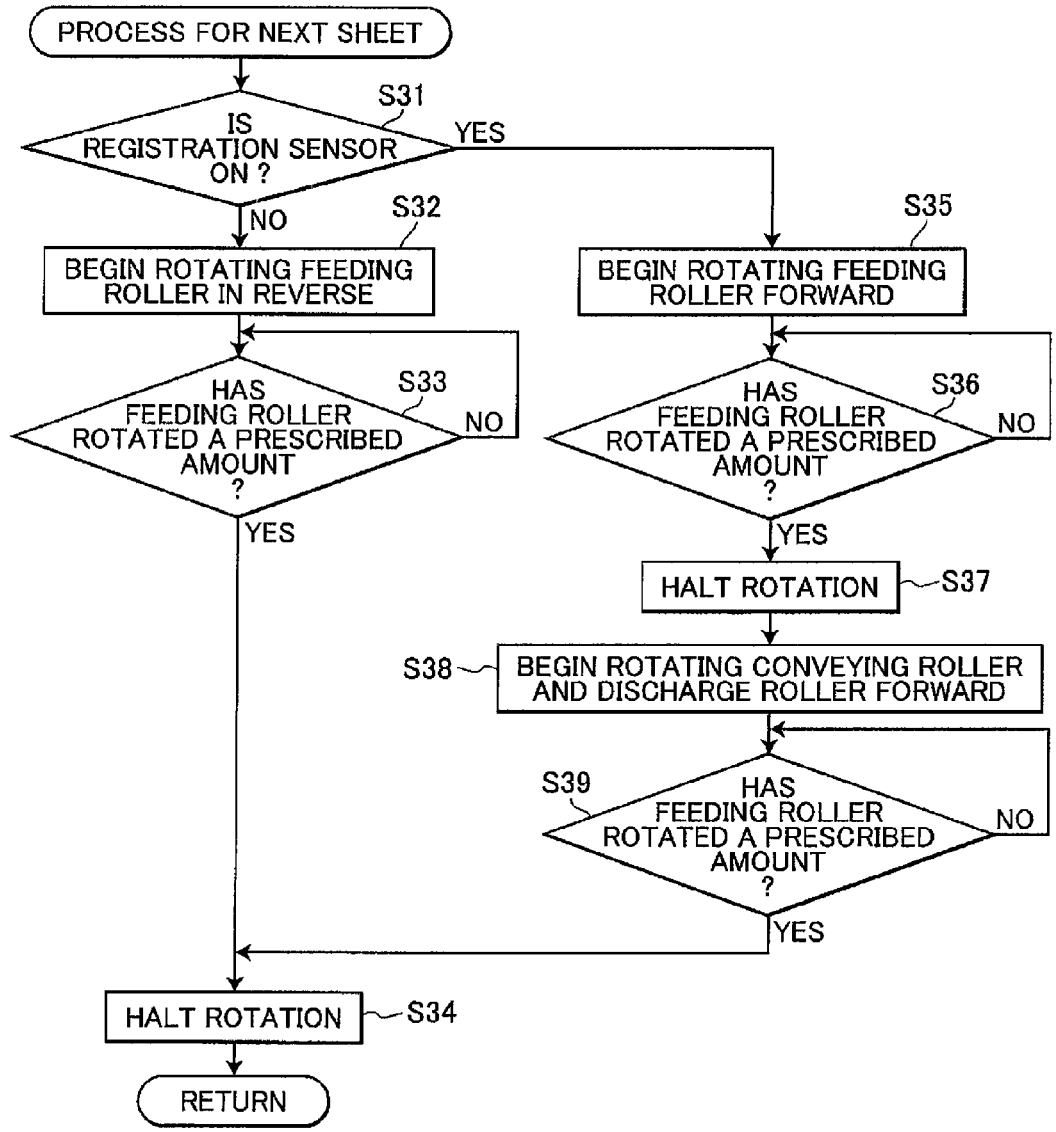
FIG. 17 is a flowchart illustrating steps in a sheet returning operation performed during a continuous feeding operation.

A control process executed by the controller for a succeeding sheet of recording paper will be described with reference to the flowchart in FIG. 17. When image recording is completed for one page worth of a preceding sheet of paper P in a continuous feeding operation, in S31 the CPU 300 determines whether the registration sensor 117 is ON. An ON signal from the registration sensor 117 indicates that the leading edge of a succeeding sheet of paper P1 has passed the paper sensor 116.

When the registration sensor 117 is OFF (S31: NO), in S32 the CPU 300 begins rotating the feeding roller 7 in reverse in order to return the succeeding sheet of paper P1 to the paper cassette 5. Here, an OFF signal from the registration sensor 117 indicates that the leading edge of the succeeding sheet of paper P1 has not yet passed the paper sensor 116.

More specifically, in the above case, the CPU 300 moves the carriage 13 toward the maintenance section 36 (the E direction in FIG. 12B), positioning the contact piece 104*a* at Po1 (see S21 and S22), at which time the switching gear 102 is engaged with the intermittent feeding transmission gear 113 as in the intermittent feeding mode described above. Next, the CPU 300 drives the linefeed motor 42 in a forward rotation so that the registration roller 20*a* of the registration rollers 20 and the discharge roller 21*a* of the discharge rollers 21 rotate forward, while the feeding roller 7 rotates in reverse.

Figure 18A:
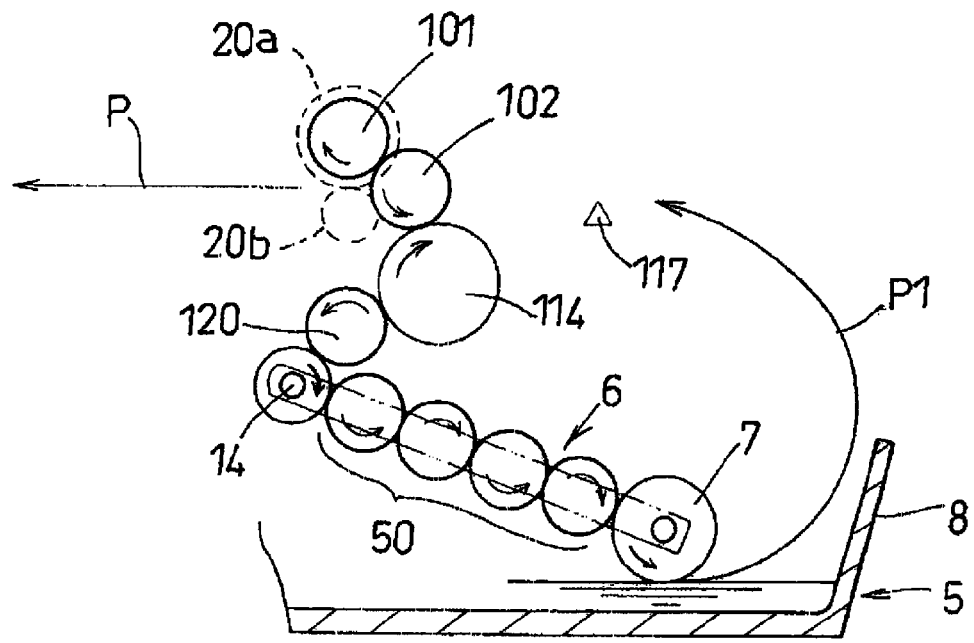
FIGS. 18A and 18B are explanatory diagrams showing two methods of a paper returning process performed in the continuous feeding mode (second mode)
Figure 18B:
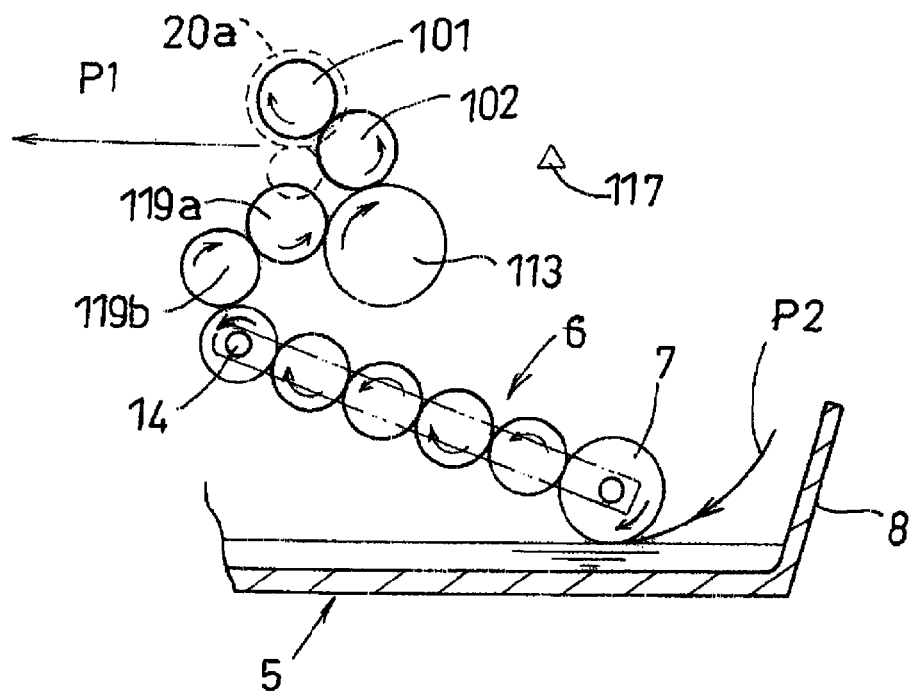

In S33 the CPU 300 determines whether the feeding roller 7 has rotated a prescribed amount. When the feeding roller 7 has rotated the prescribed amount (S33: YES), in S34 the CPU 300 halts driving of the linefeed motor 42, by which time the preceding sheet of paper P has been conveyed to the discharge section, while the succeeding sheet of paper P1 has been returned to the stack of sheets in the paper cassette 5 (see FIG. 18B)

In the above case, the front half of the succeeding sheet of paper P1 (downstream section of the paper P1) is positioned in the U-shaped section 9, and the trailing half (upstream section of the paper P1) is positioned on the paper cassette 5 side. Therefore, less time is required to return the sheet to the paper cassette 5. Further, this method eliminates the need to reset the unrecorded sheet of paper P1 in the paper cassette 5 after the paper P1 has passed through the image-recording section and has been discharged in the discharge section.

If the CPU 300 determines in S31 that the registration sensor 117 is ON (S31: YES), indicating that the leading edge of the succeeding sheet has passed the paper sensor 116, then in S35 the CPU 300 drives the linefeed motor 42 to rotate in reverse so that the feeding roller 7 rotates forward, while the registration roller 20*a* rotates in reverse (see FIG. 12A). After the feeding roller 7 has rotated the prescribed amount (S36: YES), so that the leading edge of the succeeding sheet of paper P1 contacts the registration rollers 20 to receive the registration effect, in S37 the CPU 300 halts the linefeed motor 42 temporarily to halt rotation of the registration roller 20*a* and the feeding roller 7 (see FIG. 18B). In S38 the CPU 300 subsequently drives the linefeed motor 42 to rotate in the forward direction for rotating the registration roller 20*a* and the discharge roller 21*a* forward to discharge the paper P. Since the feeding roller 7 is rotated in reverse at this time (see FIG. 18B), a sheet of paper P2 following the succeeding sheet of paper P1 can be returned to the paper cassette 5 after the feeding roller 7 has been rotated a prescribed amount (S39: YES)

The following effects are obtained by performing the process described above, whereby the succeeding sheet of paper P1 is conveyed toward the discharge side when the leading edge of the paper P1 is positioned beyond the paper sensor 116 on the downstream side and the succeeding sheet of paper P1 is returned to the paper cassette 5 when the leading edge of the paper P1 is positioned upstream of the paper sensor 116.

When there is no image-recording data for a succeeding sheet of paper P1, it is preferable not to halt the succeeding sheet of paper P1 in the U-shaped section 9 because the paper P1 is likely to take on a curl formed by the curved path in the U-shaped section 9. If the paper P1 is subsequently conveyed from this position for another recording operation, the paper P1 may become jammed when entering between the inkjet recording head 12 and the platen 11, or the curled surface of the paper P1 may make the gap between the surface of the paper and the nozzle surface of the inkjet recording head 12 too small or may even contact the nozzle surface. In order to avoid such problems, the paper P1 is discharged into the discharge section in the preferred embodiment when the leading edge of the paper P1 is positioned downstream of the paper sensor 116. The discharged paper can subsequently be reloaded in the paper cassette 5 and reused.

On the other hand, if the leading edge of the succeeding sheet of paper P1 is positioned upstream of the paper sensor 116 when image-recording data does not exist for the paper P1, then the trailing edge of the succeeding sheet of paper P1 is still pinched between the feeding roller 7 and a topmost sheet of paper P2 stacked in the paper cassette 5, provided that the paper P1 is not a short sheet, such as a postcard. Accordingly, the section of the paper P1 fed into the U-shaped section 9 is short, making a process for returning the paper P1 to the paper cassette 5 quicker than the process for discharging the paper P1 and, moreover, enabling the paper P1 to be reused without requiring the user to expend effort in returning the paper to the paper cassette 5. Further, by not discharging an unrecorded blank sheet of paper, the user is not likely to mistakenly think that a malfunction has occurred or get the impression that paper is being wasted.

As shown in FIG. 14B, L3 indicates the distance along the U-shaped section 9 from the contact point (cuing position in the claims) between the feeding roller 7 and the paper P stacked in the paper cassette 5 to the nip position between the registration rollers 20, while L4 indicates the distance from the contact point to the separating member provided on the sloped separating surface 8. In a continuous feeding operation, the distance L4 indicates the amount of overlap in the preceding sheet of paper P and the succeeding sheet of paper P1 in the conveying direction, since the feeding roller 7 begins feeding the succeeding sheet of paper P1 the instant that the trailing edge of the preceding sheet of paper P leaves the contact point with the feeding roller 7. However, since the difference between the L4 and L3 is set greater than a prescribed value and the difference between a peripheral velocity V1 of the registration roller 20a and a peripheral velocity V2 of the feeding roller 7 (V1−V2, where V1>V2) is greater than a prescribed value, the leading edge of the succeeding sheet of paper P1 is delayed so as not to reach the nip position of the registration rollers 20 before the trailing edge of the preceding sheet of paper P has left the nip position toward the downstream side in the conveying direction, thereby forming a suitable gap between the trailing edge of the preceding sheet of paper P and the leading edge of the succeeding sheet of paper P1.

Hence, it is possible to record all image-recording data corresponding to each sheet of paper at the image-recording section on the corresponding sheet of paper, even when a plurality of sheets are fed and conveyed continuously. In other words, this method prevents the trailing edge of a preceding sheet of paper P from overlapping the leading edge of the succeeding sheet of paper P1 in the image-recording section, thereby preventing an image from being recorded over both sheets. As described above, a gap can be more reliably formed between continuously fed sheets of paper by controlling the feeding roller 7 to begin cuing the succeeding sheet of paper P1 when the trailing edge of the preceding sheet of paper P conveyed only by the registration rollers 20 leaves the position cued by the feeding roller 7.

With the image-recording device 1 according to the preferred embodiment described above, the feeding roller 7 is configured to feed the paper P stacked in the paper cassette 5 one sheet at a time into the U-shaped section 9, while the registration rollers 20 convey the sheets of paper P to the image-recording section. In the meantime, the carriage 13 reciprocates in a direction intersecting the conveying direction of the paper P, while the recording head 12 mounted on the carriage 13 records an image on the paper P. With this construction, the registration rollers 20 are disposed along the U-shaped section 9 for temporarily halting and adjusting the registration of the paper fed by the feeding roller 7. The image-recording device 1 also includes the drive transmission switch 100 disposed on one end of the reciprocating path of the carriage 13 for switching the rotating and halted states of the registration roller 20a and the feeding roller 7. A controller is also provided for activating the drive transmission switch 100 based on movement of the carriage 13 and for selectively switching the transmission mode between the continuous feeding mode and the intermittent feeding mode. Hence, the image-recording device 1 having this construction can select a mode based on whether the user wishes to emphasize image quality over high-speed image recording, or to emphasize speed over image quality and can easily switch the feeding and conveying operations based on the user's request.

The drive transmission switch 100 also includes maintaining means for maintaining either of the selected modes when the carriage 13 is moved back to the image-recording region so that the mode does not change, even when the carriage 13 moves to the drive transmission switch 100 side or when the carriage 13 is returned to the image-recording region after the mode has been selected. Accordingly, it is not necessary to perform an operation, particularly in the intermittent feeding mode, to move the carriage 13 to the drive transmission switch 100 side for each registration operation, thereby achieving efficient image recording.

Further, the registration rollers 20 in the image-recording device 1 of the preferred embodiment are disposed upstream of the carriage 13 in the paper-conveying direction, and the feeding roller 7 is disposed farther upstream in the paper-conveying direction. Since the single carriage motor 24 can be used to rotate the registration roller 20a of the registration rollers 20 and the feeding roller 7 in the same direction, it is possible to feed and convey the paper through a simple construction.

Moreover, in the image-recording device 1 described above, the peripheral velocity of the registration roller 20a is set greater than that of the feeding roller 7; the feeding roller 7 is disposed on the distal end of the pivotable feeding arm 6a so as to contact or separate from the top surface of the paper P stacked in the paper cassette 5; and the feeding arm 6a is urged against the top surface of the paper Since the peripheral velocity of the registration roller 20a is greater than that of the feeding roller 7 when the succeeding sheet of paper P1 is pinched by both the registration rollers 20 and the feeding roller 7, the feeding arm 6a is pulled up by the conveyed sheet of paper P1. Although the feeding roller 7 applies a small amount of back tension to the paper P1, the force of pressure applied to the paper P1 is small and does not hinder the operation to discharge the paper P1.

Further, the nip force between the registration rollers 20 is set greater than the conveying force at the feeding roller 7, the peripheral velocity of the registration roller 20a is set greater than that of the feeding roller 7, and a controller is provided to continuously rotate the registration roller 20a and the feeding roller 7 in opposite directions to feed a sheet of paper P in the forward direction. Hence, rather than performing a feeding operation that temporarily halts each sheet of paper P that the feeding roller 7 feeds from the paper cassette 5 when the leading edge of the paper P reaches the registration rollers 20, the image-recording device 1 can continuously convey a plurality of sheets of paper to the image-recording section for image recording, thereby achieving efficient image recording through a simple construction while improving the speed of a continuous image recording process performed on a plurality of sheets of paper.

Further, by disposing the feeding roller 7 in the image-recording device 1 described above on the distal end of the feeding arm 6a and enabling the feeding arm 6a to pivot for placing the feeding roller 7 into contact with and separating the feeding roller 7 from the top surface of the paper P stacked in the paper cassette 5, this construction can facilitate a continuous feeding operation. Further, the same feeding unit 6 can be used to implement a structure for switching between the intermittent feeding mode (precision image recording) and the continuous feeding mode (high-speed image recording). Further, the image-recording device 1 of the preferred embodiment can automatically select the direction to convey a succeeding sheet of paper P1 when image data no longer exists for a succeeding sheet, facilitating recovery of the paper P1.

Detailed Description of the Process Executed by the Data Processor

Next, a process executed by the PC 401 corresponding to the data processor of the present invention in the preferred embodiment will be described with reference to FIGS. 19 and 20. The PC 401 executes this process to print a job on the image-recording device 1 described above.

The following process is particularly suited to a printing operation in the second mode described above for continuously feeding a plurality of sheets of paper from the paper cassette 5. At the beginning of the process in S101 of FIG. 19, the PC 401 outputs a print job start command to the image-recording device 1. The image-recording device 1 recognizes this command as an image-recording command and begins the process described above in FIG. 16. The process in S101 notifies a device driver and other systems involved in printing to start a new print job. All printing-related commands and the like that the PC 401 outputs from this moment until an end-of-job command is outputted in S135 described later are processed as a single print job.

In S103 the PC 401 initializes a counter B for counting the number of image divisions used in the printing process, and a counter C for counting the number of pages of images to be processed to "0". While this process will be described in greater detail below, the PC 401 in the preferred embodiment divides an image to be recorded on one sheet of paper into a plurality of image divisions and repeats a process for outputting data representing these image divisions to the image-recording device 1 for the number of image divisions, thereby recording an image on one sheet of paper. By repeating this process to record an image on one sheet of paper a plurality of times, the PC 401 can record images on a plurality of sheets of paper. The counters B and C initialized in S103 are used for counting the number of image divisions and the number of pages, respectively, where one page is equivalent to one sheet of paper.

In S105 the PC 401 executes a data process for one image division worth of data. This process is described in detail with reference to FIG. 20. In S201 of FIG. 20 the PC 401 determines whether the number of processed image divisions is 0 based on whether the value of the counter B is 0.

When the PC 401 first executes the process in S201 in a given print job, the PC 401 has not yet processed any image divisions and, hence, the value of the counter B is 0. Therefore, in S201 the PC 401 determines that the number B of processed image divisions is 0 (S201:YES). Consequently, in S203 the PC 401 determines whether the number of processed pages is 0.

When the PC 401 first executes the process in S203, the PC 401 has not yet processed any pages of image data and, hence, the value of the counter C is 0. Accordingly, in S203 the PC 401 determines that the number of processed pages is 0 (S203: YES), and in S205 the PC 401 initializes a memory area for storing image division data. While there is no particular restriction on the amount of memory allocated in S205, the allocated memory area must have sufficient capacity in relation to the timing that a next page exists command described later is outputted.

More specifically, a suitable timing to begin conveying a succeeding sheet of paper during a continuous feeding operation on the image-recording device 1 is determined based on the length of the path from the position of the paper supply source to the position for recording, and the conveyed velocity of the paper. This suitable timing is set as a reference timing. If the next page command described later is outputted at a timing slower than this reference timing, then the timing to begin conveying the next sheet of paper will be delayed. Hence, the timing for outputting the next page command should be quicker than the reference timing.

On the other hand, the timing for outputting the next page command changes based on the amount of memory allocated in S205. More specifically, when the PC 401 divides an image to be recorded on an $N^{th}$ page into a plurality of image division data segments and transmits this data in a process described below, some of the sequentially transmitted image division data segments are directly transmitted to the image-recording device 1, while the remaining image division data segments are temporarily stored in the memory area allocated in S205. Subsequently, the PC 401 checks whether an image is to be recorded on an $N+1^{th}$ page and, if so, transmits a next page exists command to the image-recording device 1. Next, the PC 401 transmits the image division data segments stored in the memory area to the image-recording device 1. Hence, if an image exists to be recorded on an $N+1^{th}$ page, the PC 401 subsequently executes the same process described above for the $N+1^{th}$ page.

In other words, the PC 401 transmits data to the image-recording device 1 in the order of some of the image division data segments for an $N^{th}$ page, a next page exists command, the remaining image division data segments for the $N^{th}$ page, some of the image division data segments for an $N+1^{th}$ page, and so on. Therefore, if a large amount of memory has been allocated in S205, it is possible to increase the amount of data for the $N^{th}$ page that is transmitted after transmitting a next page exists command and to decrease the amount of data transmitted prior to the next page command, thereby enabling the PC 401 to transmit the next page command at a relatively quicker timing. Conversely, if the amount of memory allocated in S205 is small, then it is necessary to transmit more data prior to transmitting the next page command and less data after transmitting the next page command, resulting in the PC 401 transmitting the next page command at a relatively slower timing.

Hence, the amount of memory allocated in S205 should be sufficient for enabling the PC 401 to transmit the next page command quicker than the reference timing described above. When the amount of allocated memory is too small, it is likely that the PC 401 can only output the next page command at a slower timing than the reference timing.

On the other hand, allocating an excessively large amount of memory in S205 may tie up a large amount of memory unnecessarily. Although the PC 401 can transmit the next page command at a quicker timing than the reference timing, there is no need to output the command at an excessively early timing, but merely at a timing coinciding with the start of conveying the next sheet of paper.

Hence, after broadly determining the amount of memory required to ensure that the timing for outputting the next page command is not too slow, in S205 the PC 401 allocates this memory.

In S207 the PC 401 calculates a threshold for the number of remaining image divisions at which the PC 401 switches from outputting image divisions directly to the image-recording device 1 to temporarily saving image divisions in memory. While this will be described in greater detail below, in the preferred embodiment, there is a case in which the PC 401 directly outputs the image division data to the image-recording device 1 and a case in which the PC 401 temporarily saves the image division data in memory. The PC 401 determines whether image division data is to be directly outputted to the image-recording device 1 or temporarily saved in memory based on whether the value of the counter B has exceeded the threshold calculated in S207. In the preferred embodiment, the threshold calculated in S207 varies according to the size of the image in the paper conveying direction.

Specifically, the image-recording device 1 according to the preferred embodiment sets strip-like images called bands as unit images and repeatedly and alternately performs an operation to record a unit image and an operation to convey the paper until the entire image has been recorded on the paper. The image divisions described above are equivalent to these unit images, or bands. The size of the image division in the paper-conveying direction is a fixed value L1 determined for each image-recording device 1. The size of the entire image in the paper-conveying direction is a variable value L2 that differs according to each image. Therefore, when dividing an image of the size L2 in the paper-conveying direction into image divisions of the size L1 in the paper-conveying direction, a number N1 of image divisions is a variable found by the equation N1=L2/L1 (with the numbers right of the decimal point rounded up). A threshold N2 calculated in S207 is found based on the number N1 of image divisions and a predetermined fixed value N3. In other words, N2 is a variable found by the equation N2=N1-N3.

When transmitting an image to the image-recording device 1, the PC 401 divides the image into image divisions to be transmitted directly to the image-recording device 1 and image divisions to be stored temporarily in the RAM 302 of the PC 401 and transmitted later. The threshold N2 corresponds to the number of image divisions to be transmitted directly to the image-recording device 1, while the fixed value N3 corresponds to the number of image divisions to be temporarily stored in the RAM 302 and transferred later.

The fixed value N3 is preferably set so that the distance in the conveying direction for N3 image divisions (N3×L1) is greater than or equal to the distance for conveying the paper P1 from the paper cassette 5 to the recording unit 10. The fixed value N3 is also preferably set greater than or equal to the length along the long side of the paper from the contact point between the paper P1 currently being fed (the paper P1 following the paper P currently undergoing image recording) and the feeding roller 7 to the nip point between the registration rollers 20. Further, the fixed value N3 is preferably set greater than or equal to the distance from the contact point between the paper P1 currently being fed and the feeding roller 7 and the contact point between the paper P1 currently being fed and the paper sensor 116. Further, the distance from an edge of the paper downstream in the paper-conveying direction to a point farthest downstream in the region of the paper P in which image recording is performed (recording start margin)+N3×L1 is preferably greater than or equal to the length described above.

By setting the fixed value N3 in advance as described above, the distance for N3 image divisions in the conveying direction (N3×L1) is greater than or equal to the length described above. Accordingly, the leading edge of a paper P1 following a paper P currently undergoing image recording will never pass the paper sensor 116. As a result, the registration sensor 117 is off (S31: NO), and the process described above in S32-S34 can be performed to return the paper P1 to the cassette rather than discharging the paper P1.

After finding the threshold described above, in S209 the PC 401 executes a process to generate image division data. This process includes a process for converting RGB bitmap data to CMYK raster data for one band using a graphics device interface (GDI), for example. However, there are many methods of producing image division data, and the method in the preferred embodiment is not limited to generating data via the GDI. For example, the PC 401 may simply use data read from a file as the image division data or may generate image division data based on data acquired through an interface other than a GDI. Further, the method of producing image data is not limited to a method for converting RGB bitmap data to CMYK raster data, but may be a method of converting vector data to raster data or simply a process of acquiring the CMYK raster data itself.

In S211 the PC 401 determines whether the number B of processed image divisions exceeds the output switching threshold N2. When the PC 401 first executes the process in S211, the PC 401 has not yet processed any image divisions and, hence, the value of the counter B is 0. Accordingly, at this time the PC 401 determines in S211 that, the number B of processed image divisions has not yet exceeded the threshold N2 (S211: NO), and in S213 the PC 401 directly outputs the image division data to the image-recording device 1. Subsequently, the data process for one image division in FIG. 20 ends. The image-recording device 1 treats this image division data as image recording data and performs either the process in S6 or S15 described above.

Figure 19:
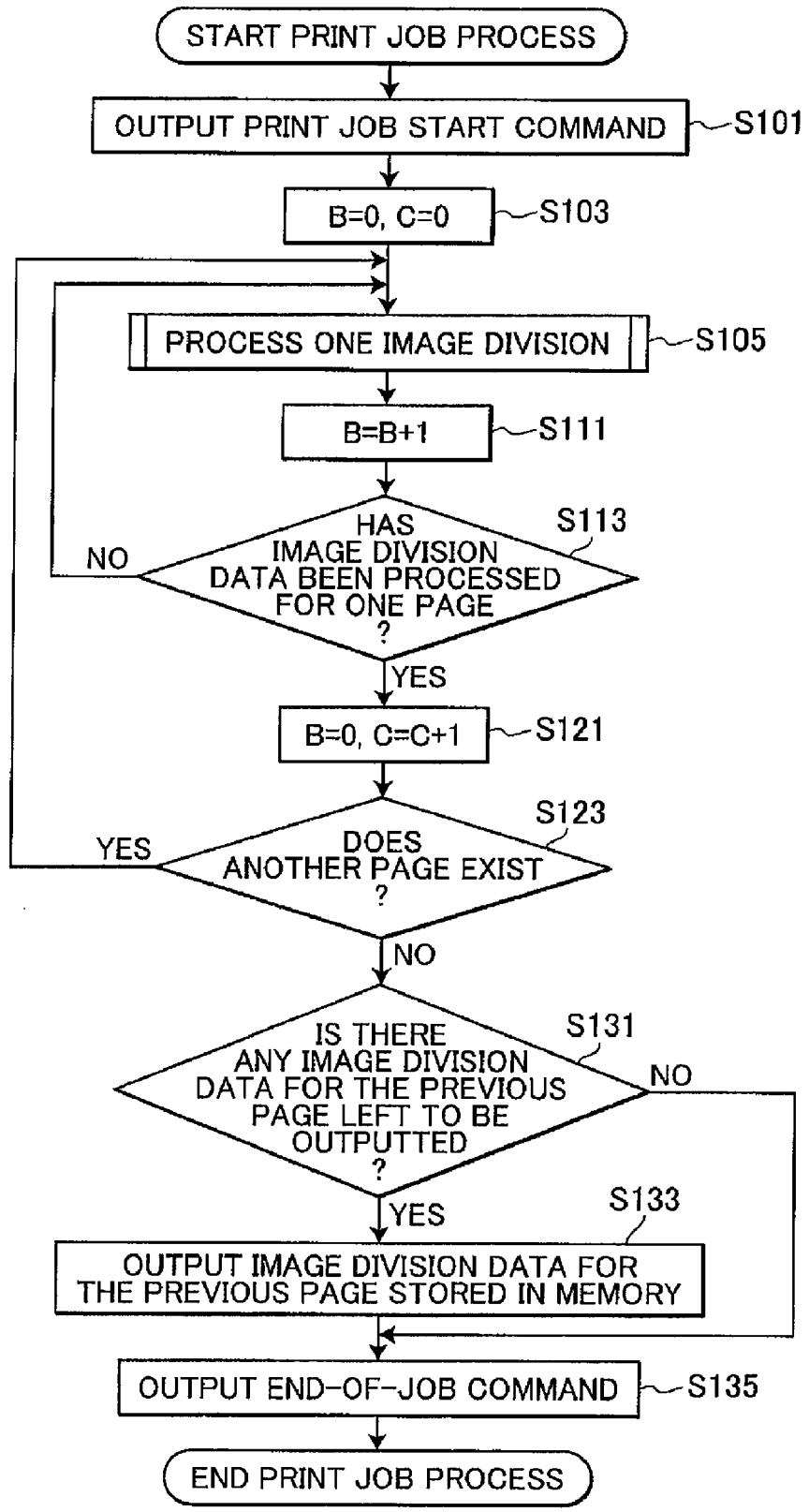
FIG. 19 is a flowchart illustrating steps in a print job process.

After completing the process shown in FIG. 20, the process of S105 in FIG. 19 is completed, and in S111 the PC 401 increments the counter B by 1, where the counter B indicates the number of processed image divisions. In S113 the PC 401 determines whether image division data for one page worth has been processed.

If the PC 401 determines that image division data for one page worth has not yet been processed (S113: NO), then the PC 401 returns to S105 and repeats the process in S105-S113 to sequentially process image division data in one page. Since the image-recording device 1 treats this image division data as image recording data, the image-recording device 1 repeats the process in S7 or in S16-S17 described above.

However, while repeating the process in S105-S113, the PC 401 is incrementing the number B of processed image divisions in S111. Therefore, the PC 401 reaches a negative determination when subsequently executing the process in S201 (S201: NO). That is, in S201 the PC 401 only reaches a positive determination initially when the counter B is 0, and reaches negative determinations thereafter as the counter B is incremented to 1, 2, 3,. When a negative determination is reached in S201, the PC 401 skips the process in S203-S207 described above and advances directly to S209. Hence, the PC 401 repeatedly executes the process in S209-S213 described above until the number B of processed image divisions exceeds the output switching threshold N2.

After the process described above for S105-S113 is repeated a number of times, the number B of processed image divisions exceeds the output switching threshold N2. At this time, the PC 401 determines in S211 described above that the number B of processed image divisions has exceeded the threshold N2 (S211: YES), and in S221 the PC 401 stores the image division data in memory that was allocated and initialized in S205. Subsequently, the data process of FIG. 20 for one image division is completed. Since the image-recording device 1 does not receive this image division data, the image-recording device 1 waits at either S7 or S17 described above.

In other words, the PC 401 executes the process in S213 to directly output the image division data to the image-recording device 1 until the number B of processed image divisions exceeds the output switching threshold N2. However, after the number B of processed image divisions exceeds the output switching threshold N2, the PC 401 executes a process to store the image division data in memory rather than outputting the image division data directly to the image-recording device 1.

When the PC 401 determines in S113 that image division data for one page has been processed while repeating the process in S105-S113 described above (S113: YES), in S121 the PC 401 resets the counter B to 0 and increments the counter C by 1. In S123 the PC 401 determines whether a successive page of image data exists.

When the PC 401 determines in S123 that another page exists (S123: YES), the PC 401 returns to S105. However, since the counter B was reset to 0 and the counter C incremented by 1 in S121, the PC 401 once again reaches a positive determination in S201. As a result, the PC 401 advances to S203 to determine whether the number of processed pages is 0.

When the PC 401 first executed the process in S203, the PC 401 had not yet processed a page of image data and the value of the counter C was 0. However, since the counter C was incremented in S121, the PC 401 reaches a negative determination in S203 (S203: NO).

Therefore, in S231 the PC 401 outputs the next page command to the image-recording device 1. By transmitting this command, the image-recording device 1 determines in S16 that a next page exists command has been received (Sl6: YES).

In S233 the PC 401 determines whether any image division data for the previous page stored in memory in S221 described above has not yet been outputted. If image division data for the previous page still exists in memory (S233: YES), then in S235 the PC 401 outputs the image division data for the previous page saved in memory to the image-recording device 1. The image-recording device 1 treats this image division data as image-recording data and performs the process in either S7 or S16-Sl7.

If the PC 401 determines that there exists no image division data for the previous page that has not yet been outputted (S233: NO), then the PC 401 skips S235.

Through the process of S231-S235 described above, the PC 401 outputs a next page exists command and image division data for the previous page that has not been outputted, if such data exists. Hence, the PC 401 sequentially outputs image division data for the previous page directly to the image-recording device 1 until the number B of processed image divisions exceeds the output switching threshold N2, then outputs a next page exists command, and subsequently outputs any remaining image division data stored in memory to the image-recording device 1, thereby completing all output of image division data for the previous page.

After completing the process in S231-S235, the PC 401 advances to the process beginning from S207 described above. Since the value of the counter B was reset to 0 in S121, the PC 401 executes the process in S213 at this time for directly outputting image division data to the image-recording device 1. After repeating the process in S105-S113 a number of times until the number B of processed image divisions exceeds the output switching threshold N2, in S221 the PC 401 stores image division data in memory. In short, after completing the process in S231-S235, images for the second and subsequent pages are processed in the same way as the first page.

By sequentially processing images for the second and subsequent pages in this way, eventually all image data is processed. At this time, the PC 401 determines in S123 that a successive page does not exist (S123: NO), and in S131 determines whether there exists any image division data for the previous page that has not yet been outputted. If such image division data remains (S131: YES), then in S133 the PC 401 outputs the image division data for the previous page saved in memory to the image-recording device 1. When the PC 401 determines that there exists no image division data for the previous page that has not yet been outputted (S131: NO), the PC 401 skips S133, in S135 outputs an end-of-job command, and subsequently ends the process in FIG. 19. The image-recording device 1 recognizes this end-of-job command as data indicating the end of the image-recording process (S11: YES).

Next, a more detailed example of the print job process will be described. This example will be described for a case employing Windows (registered trademark) 2000 as the OS.

A device driver supporting the image-recording device 1 is installed on the PC 401 and integrated with the OS, enabling the OS to control the image-recording device 1 via the device driver. This device driver is a collection of functions that, are called by the OS. When processing a print job, the OS calls one of the functions offered by the device driver according to a prescribed procedure, resulting in the device driver executing the corresponding process.

Specifically, from the beginning to the end of a single print job process, the OS calls a function StartDoc, repeatedly calls a function NextBand, and calls a function EndDoc in the sequence given. The result is the processes in FIGS. 19 and 20 being executed on the PC 401.

More specifically, when the PC 401 executes the processes in FIGS. 19 and 20, the OS first calls the function StartDoc. As a result, the PC 401 executes the process in S101-S103.

Next, the OS calls the function NextBand. This function NextBand is equivalent to the "process for one image division" included in the process of S105-S123. When the OS calls the function NextBand, the PC 401 executes the process in S105-S113 if image division data for one page has not yet been processed and executes the process in S105-121 if image division data for one page has been processed.

The OS calculates in advance how many times the function Next Band should be called to record an image for one page on the recording medium based on the size of the image for the page and the size of the image divisions. In S113 the PC 401 determines whether image division data for one page has been completely processed based on whether the function NextBand has been called the pre-calculated number of times. The determination in S123 is also performed by the OS that calls NextBand. If the OS determines in S123 that there is another page, then the OS calls the function NextBand.

However, if the OS determines in S123 that there are no more pages (i.e., the function NextBand has been called the pre-calculated number of times), then the OS calls the function EndDoc. As a result, the PC 401 executes the process in S131-S135.

In the process described above, the OS does not provide data or the like indicating the total number of pages of images to be recorded on paper. However, the process for outputting the next page command and the process for switching whether to output image data directly to the device or whether to save the data in memory are executed based on the counters B and S, enabling these processes to be executed at a suitable timing.

As described above, when transmitting image data for an image to be recorded on an $N^{th}$ sheet of recording medium to the image-recording device 1, the PC 401 transmits the next page command to the image-recording device 1 (S231) prior to completing transmission of image data for the image to be recorded on the $N^{th}$ sheet of recording medium (S235) under the condition that an image to be recorded on an $N+1^{th}$ sheet of recording medium exists.

Therefore, the PC 401 can control the image-recording device 1 to begin conveying the $N+1^{th}$ sheet of recording medium prior to completing image recording on the $N^{th}$ sheet. This method enables the image-recording device 1 to complete image recording on a plurality of sheets of recording medium faster than an image-forming device that begins conveying the $N+1^{th}$ sheet of recording medium after image data for an image to be recorded on this sheet is received.

Even when the size of the entire image varies, the timing at which the PC 401 transmits the next page command and the timing at which the PC 401 completes transmission of an image for the $N^{th}$ page are substantially fixed timings based on the size of the region for which image data has not been transmitted (the amount of image data stored in memory). Therefore, the PC 401 can transmit the next page command at an appropriate timing, regardless of whether the size of the overall image changes. In other words, after the PC 401 transmits the next page command indicating the existence of a page to be recorded on an $N+1^{th}$ sheet of recording medium, the image data remaining in memory to be recorded on the $N^{th}$ sheet of recording medium has a substantially fixed size, regardless of the size of the overall image. Accordingly, the PC 401 can transmit the next page command at a suitable timing for the image-recording device 1 to begin conveying the $N+1^{th}$ sheet of recording medium, without an excessive amount of image data being transferred after transmission of the next page command.

Further, since the PC 401 can determine the existence of an image to be recorded on the $N+1^{th}$ sheet of recording medium based on the existence of image data targeted for transmission, the PC 401 can make this determination, even without acquiring data other than image data indicating the number of pages of images to be recorded.

Further, since the PC 401 transmits image data to the image-recording device 1 in S213 without temporarily saving the data in memory until the size of the image region for which image data remains to be transferred is no greater than a predetermined size, the PC 401 enables the image-recording device 1 to begin operating earlier than when image data is always temporarily stored in memory. Further, by not allocating an excessively large amount of memory for temporarily storing data, this method makes effective use of the resources in the PC 401.

Although the present invention has been described with respect to specific embodiments, it will be appreciated by one skilled in the art that a variety of changes may be made without departing from the scope of the invention.

For example, while the preferred embodiment was described in detail for a specific OS, it should be apparent that the present invention may be implemented with another Os. When using a different OS, the method of calling functions may different from that with the specific OS described above. As long as the data processor can be configured to execute the overall process described above, differences in the roles of individual functions in the OS are of no consequence.

While the image-recording device 1 having specific mechanisms and functions was described in detail in the preferred embodiment, there are no particular restrictions on the mechanisms and functions of an image-forming device to which the present invention is applied, provided that the device can be configured to begin conveying a succeeding sheet of recording medium upon receiving indicate data indicating the existence of a succeeding page.

What is claimed is:

1. A data processor connected to an image-forming device, the image-forming device comprising an image forming unit for forming images based on image data and a feeding unit for feeding a sheet of recording medium toward the recording unit, the data processor comprising:

a data transmitting unit configured to transmit to an image-forming device image data to be recorded on a sheet of recording medium;

a next page determining unit configured to determine whether there exists an image to be recorded on an $(N+1)^{th}$ sheet of recording medium after the data transmitting unit begins to transmit image data for an image to be recorded on an $N^{th}$ sheet of recording medium and before the data transmitting unit has completed transmitting the image data for the image to be recorded on the $N^{th}$ sheet of recording medium where N is an integer greater than or equal to 1; and an indicate data transmitting unit configured to transmit indicate data indicating existence of the image to be recorded on the $(N+1)^{th}$ sheet of recording medium to the image-forming device before the data transmitting unit has completed transmitting the image data for the image to be recorded on the $N^{th}$ sheet of recording medium when the next page determining unit determines that there exists the image to be recorded on the $(N+1)^{th}$ sheet of recording medium, wherein the image data to be recorded on the $N^{th}$ sheet of recording medium comprises a plurality of pieces of image division data for a plurality of regions of the image to be recorded on the $N^{th}$ sheet of recording medium, the data transmitting unit transmitting the plurality of pieces of image division data to the image-forming device for recording the image on the $N^{th}$ sheet of recording medium in sequence from a region at a leading edge of the recording medium to a region at a trailing edge of the recoding medium, and wherein the indicate data transmitting unit transmits the indicate data to the image-forming device after the data transmitting unit has transmitted at least one piece of image division data to the image-forming device, and wherein remaining pieces of image division data that remain untransmitted when the indicate data transmitting unit transmits the indicate data to the image-forming device has a data size greater than or equal to a predetermined value, the predetermined value corresponding to a distance between the feeding unit and a prescribed position within the image forming device.

2. The data processor according to claim 1, further comprising a storage unit that temporarily stores the remaining pieces of image division data that remain untransmitted, wherein the next page determining unit determines that there exists an image to be recorded on the $(N+1)^{th}$ sheet of recording medium when the remaining pieces of image division data to be recorded on the $N^{th}$ sheet of recording medium is stored in the storage unit and the data transmitting unit has acquired the image data to be recorded on the $(N+1)^{th}$ sheet of recording medium.

3. The data processor according to claim 2, wherein the data transmitting unit transmits the remaining pieces of image division data stored in the storage unit to the image-forming device after the indicate data transmitting unit transmits the indicate data to the image-forming device.

4. The data processor according to claim 1, wherein the predetermined value correspond to a distance between the feeding unit and the image forming unit.

5. A method of controlling an image-forming device, the image-forming device comprising an image forming unit for forming images based on image data and a feeding unit for feeding a sheet of recording medium toward the recording unit, the method comprising:

transmitting the image data for an image to be recorded on an $N^{th}$ sheet of recording medium to the image-forming device where N is an integer greater than or equal to 1;

determining whether there exists an image to be recorded on an $(N+1)^{th}$ sheet of recording medium after transmitting image data for the image to be recorded on the $N^{th}$ sheet of recording medium begins and before transmitting the image data for the image to be recorded on the $N^{th}$ sheet of recording medium has been completed; and transmitting indicate data indicating existence of the image to be recorded on the $(N+1)^{th}$ sheet of recording medium to the image-forming device before transmitting the image data for the image to be recorded on the $N^{th}$ sheet of recording medium has been completed when determination is made so that there exists the image to be recorded on the $(N+1)^{th}$ sheet of recording medium, wherein the image data to be recorded on the $N^{th}$ sheet of recording medium comprises a plurality of pieces of image division data for a plurality of regions of the image to be recorded on the $N^{th}$ sheet of recording medium, the plurality of pieces of image division data is transmitted to the image-forming device for recording the image on the $N^{th}$ sheet of recording medium in sequence from a region at a leading edge of the recording medium to a region at a trailing edge of the recoding medium, and the indicate data is transmitted to the image-forming device after transmitting at least one piece of image division data to the image-forming device, and wherein remaining pieces of image division data that remain untransmitted when the indicate data is transmitted to the image-forming device has a data size greater than or equal to a predetermined value, the predetermined value corresponding to a distance between the feeding unit and a prescribed position within the image forming device.

6. The method according to claim 5, further comprising temporarily storing the remaining pieces of image division data that remain untransmitted, wherein determination is made so that there exists an image to be recorded on the $(N+1)^{th}$ sheet of recording medium when the remaining pieces of image division data to be recorded on the $N^{th}$ sheet of recording medium is stored in the storage unit, and when the image data to be recorded on the $(N+1)^{th}$ sheet of recording medium has been acquired.

7. The method according to claim 5, wherein remaining pieces of image division data that remain untransmitted after the indicate data is transmitted to the image-forming device has a data size equal to or less than a predetermined value, the method further comprising temporarily storing the remaining pieces of image division data in a storage unit.

8. A non-transitory computer-readable storage medium that stores a data processing program for an image-forming device comprising an image forming unit for forming images based on image data and a feeding unit for feeding a sheet of recording medium toward the recording unit, the data processing program comprising:

instructions for transmitting image data for an image to be recorded on an $N^{th}$ sheet of recording medium to the image-forming device where N is an integer greater than or equal to 1;

instructions for determining whether there exists an image to be recorded on an $(N+1)^{th}$ sheet of recording medium after transmitting image data for the image to be recorded on the $N^{th}$ sheet of recording medium begins and before transmitting the image data for the image to be recorded on the $N^{th}$ sheet of recording medium has been completed; and instructions for transmitting indicate data indicating existence of the image to be recorded on the $(N+1)^{th}$ sheet of recording medium to the image-forming device before transmitting the image data for the image to be recorded on the $N^{th}$ sheet of recording medium has been completed when determination is made so that there exists the image to be recorded on the $(N+1)^{th}$ sheet of recording medium, causing the image-forming device to begin conveying the $(N+1)^{th}$ sheet of recording medium for recordation before an entire image has been recorded on the $N^{th}$ sheet of recording medium under a condition that the image-forming device receives the indicate data indicating existence of the image to be recorded on the $(N+1)^{th}$ sheet of recording medium, wherein the image data to be recorded on the $N^{th}$ sheet of recording medium comprises a plurality of pieces of image division data for a plurality of regions of the image to be recorded on the $N^{th}$ sheet of recording medium, the plurality of pieces of image division data is transmitted to the image-forming device for recording the image on the $N^{th}$ sheet of recording medium in sequence from a region at a leading edge of the recording medium to a region at a trailing edge of the recoding medium, and the indicate data is transmitted to the image-forming device after transmitting at least one piece of image division data to the image-forming device, and wherein remaining pieces of image division data that remain untransmitted when the indicate data is transmitted to the image-forming device has a data size greater than or equal to a predetermined value, the predetermined value corresponding to a distance between the feeding unit and a prescribed position within the image forming device.

9. The non-transitory computer-readable storage medium according to claim 8 comprises a recording medium.

* * * * *